(12) United States Patent
Sueshige et al.

(10) Patent No.: US 6,390,216 B1
(45) Date of Patent: May 21, 2002

(54) MOTORIZED CART

(75) Inventors: Hiroshi Sueshige; Seishiyu Sakai, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/263,370

(22) Filed: Mar. 5, 1999

Related U.S. Application Data

(63) Continuation-in-part of application No. 08/612,275, filed on Mar. 7, 1996, now abandoned.

(30) Foreign Application Priority Data

| Apr. 10, 1995 | (JP) | 7-84285 |
| May 12, 1995 | (JP) | 7-114866 |
| May 17, 1995 | (JP) | 7-118789 |

(51) Int. Cl.$^7$ ................................. B60K 1/00
(52) U.S. Cl. .............. 180/65.5; 180/6.48; 180/6.5; 180/65.1; 180/68.5; 180/208; 180/210; 180/216; 280/DIG. 5
(58) Field of Search ............... 180/907, 65.1, 180/65.5, 68.5, 6.2, 208, 210, 215, 216, 6.48, 6.5, 21; 280/DIG. 5

(56) References Cited

U.S. PATENT DOCUMENTS

| 3,055,448 A | 9/1962 | Fagel |
| 3,908,776 A * | 9/1975 | Dudley ............... 180/6.5 |
| 4,538,695 A | 9/1985 | Bradt |
| 4,874,055 A | 10/1989 | Beer |
| 5,199,520 A * | 4/1993 | Chen ............... 180/65.5 |
| 5,307,890 A | 5/1994 | Haung |
| 5,691,584 A | 11/1997 | Toida et al. |

FOREIGN PATENT DOCUMENTS

| GE | 2224984 | * 5/1990 |
| JP | 62-265023 | 11/1987 |
| JP | 63-101132 | 5/1988 |
| JP | 2-218377 | 8/1990 |
| JP | 3-109191 | 5/1991 |
| JP | 5-161207 | 6/1993 |
| JP | 6-42560 | 2/1994 |

* cited by examiner

Primary Examiner—Eric Culbreth
(74) Attorney, Agent, or Firm—Merchant & Gould, P.C.

(57) ABSTRACT

A power unit for use with a motorized cart. Two wheels are rotatably mounted to opposite ends of an interconnecting member. In one embodiment, at least one driving motor is housed in at least one of these two wheels. In another embodiment, a driving motor is housed in one of the two wheels, and batteries are housed in the other wheel. In a further embodiment, two opposite platforms are mounted over the interconnecting member in a spaced relation to each other. In yet another embodiment, a battery-accommodating portion is disposed between the two platforms. Batteries are housed in the battery-accommodating portion. Where the cart is a golf cart, the motor and the batteries are concealed from view in every embodiment of the invention. This is favorable from an aesthetical point of view. Furthermore, the space in at least one wheel can be effectively utilized. Where the frame of the golf cart is foldable, it is easy to store and transport the cart.

22 Claims, 27 Drawing Sheets

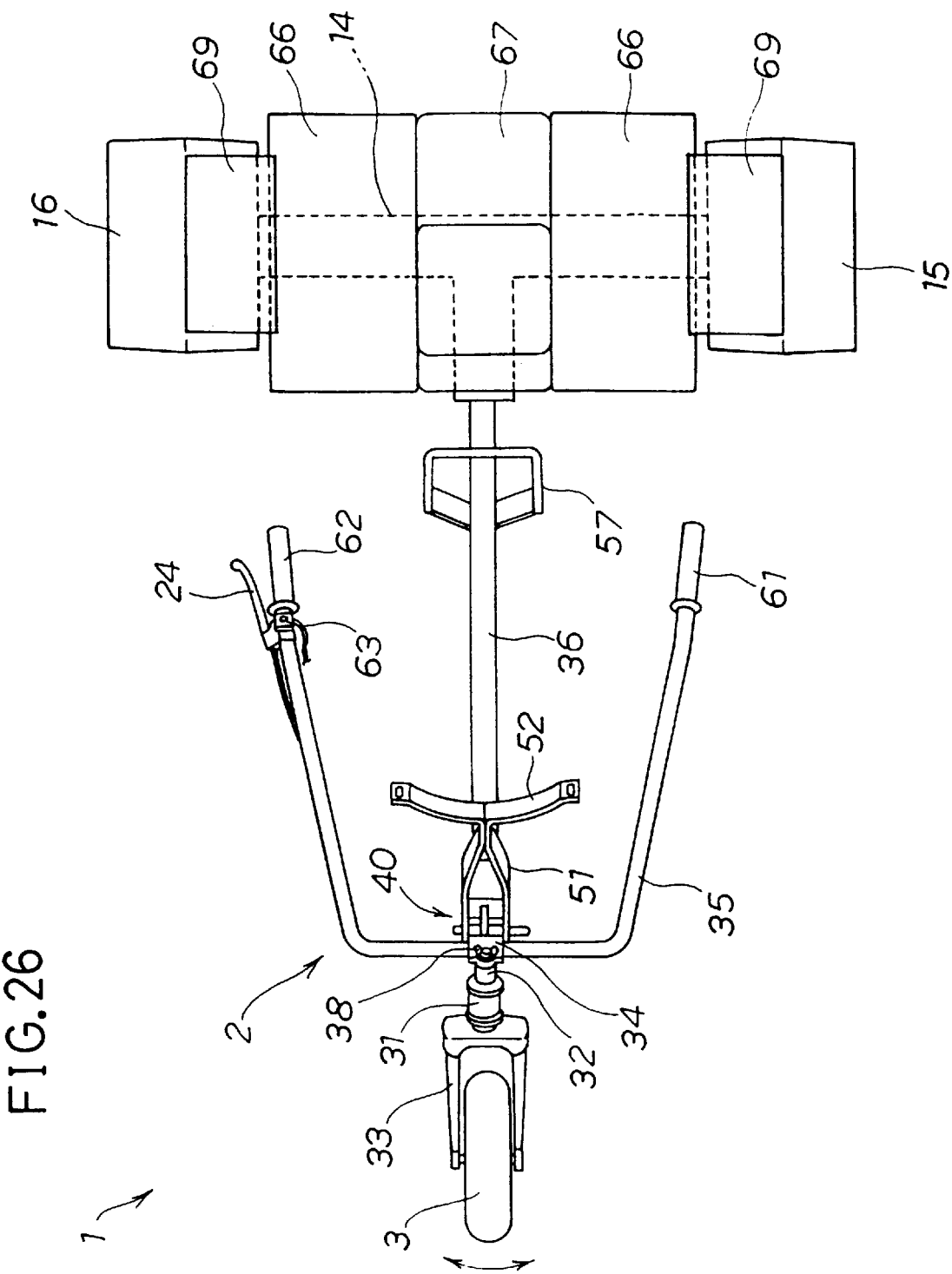

MOTORIZED CART

This application is a Continuation-in-Part of U.S. patent application Ser. No. 08/612,275, filed Mar. 7, 1996, abandoned.

BACKGROUND OF THE INVENTION

1. Field of the Invention

The present invention relates to improvements in motorized carts and, more particularly, to improvements in the structure of a power unit having a driving motor mounted in a motorized three-wheeled cart, electric golf cart and the like, and also to improvements in the structure for mounting batteries.

2. Description of the Related Art

"Motorized carts" referred to herein embrace four-wheeled vehicles driven by means of driving motors, as well as motor-driven three-wheeled vehicles and electric golf carts.

In recent years, electric golf carts are used for carrying golf players and their golf clubs over golf courses during play. These golf carts come in various forms. Among them, motorized three-wheeled carts are most frequently used. One example of such motorized three-wheeled carts is disclosed in U.S. Pat. No. 4,538,695 entitled "Battery-Driven Golf Cart".

This battery-driven golf cart is schematically shown in plan in FIG. 32, which has been drawn based on FIGS. 1–3 of the above-cited U.S. patent. In FIG. 32, the battery-driven golf cart is generally indicated by reference numeral 100 and comprises a frame 101, a single front wheel 102 mounted to the frame 101, two rear wheels 103 mounted to the frame 101, two electric motors 104, and two electric batteries 105. The motors 104 drive the two rear wheels 103, respectively, via their respective reduction mechanisms 106.

The battery-driven golf cart 100 is further equipped with U-shaped bag support portions 107 mounted on the front portion of the frame 101. Golf bags 108 are carried on the bag support portions 107, respectively. The golf cart has a platform 109 on which players can stand. Under this condition, the cart moves through a golf course. Accordingly, when this battery-driven golf cart 100 is utilized, golfers' labor to carry the golf bags 108 is alleviated. Furthermore, it is not necessary for them to walk.

The platform 109 is stretched on the top of the frame 101. Also shown are a steering wheel 111 and a clutch lever 112 for controlling the transmission of the power from the motors 104 to the rear wheels 103.

The technique disclosed in the above-cited U.S. Pat. No. 4,538,695 includes the motors 104, batteries 105, and reduction mechanisms 106 mounted to frame 101. Among these components, the power unit including the motors 104 and the batteries 105 occupy a large space. These motors 104 and batteries 105 are installed so that they are exposed to the outside. Therefore, the golf cart 100 itself is bulky and heavy. The vehicle has an unattractive appearance. Moreover, the motors and batteries are obstacles to the golfers carried on the platform. The rod connecting together the two rear wheels is a straight rod or pipe. The space around this rod is not effectively utilized.

In the above-described known technique, the golf bags 108 are made to stand upright on the battery-driven golf cart 100. When a golfer takes his golf club 115 out of his golf bag 108, he often holds the head of the club by his hand. Therefore, it is necessary to stretch his arm upward by an amount corresponding to the whole length of the golf club 115 at this time. This makes it difficult to take out the golf club 115.

SUMMARY OF THE INVENTION

It is an object of the present invention to provide a power unit which is for use with a motorized cart and which permits driving motors, batteries, and/or reduction mechanisms to be mounted inside wheels so that they are concealed from view, whereby the function of the motorized cart exhibits its highest aesthetical aspect.

It is another object of the invention to provide a power unit which is for use with a motorized cart and which permits the space along the member interconnecting two wheels to be utilized effectively.

It is a further object of the invention to provide a power unit which is for use with a motorized cart and which permits the interconnecting member to be folded and thus the interconnecting member can be stored and transported.

It is a yet other object of the invention to provide a structure which mounts batteries to a motorized cart while effectively utilizing spaces at various portions of the cart.

It is a still other object of the invention to provide a small-sized, lightweight motorized three-wheeled cart which has a good appearance.

It is an additional object of the invention to provide a golf cart which permits golfers to easily take golf clubs in and out of golf bags carried on the cart.

One aspect of the present invention lies in a power unit which is for use with a motorized cart having two wheels mounted to the opposite ends, respectively, of an interconnecting member. At least one driving motor is accommodated in at least one of the two wheels. Therefore, the motor is concealed from view which is excellent from an aesthetical point of view. Furthermore, the spaced inside the wheels can be effectively utilized. Any special space to install the driving motor is not necessary.

In another aspect of the invention, a driving motor is accommodated in one of two opposite wheels, while batteries are installed in the other wheel. Therefore, neither the motor nor the batteries are exposed. In addition, spaces which would normally be needed to install the motor and batteries are dispensed with.

The interconnecting member is shaped like a rod. A platform is mounted on top of the interconnecting member. The platform can sustain humans and objects.

The platform can be mounted stably by making the interconnecting member assume a Y-shaped or rectangular form in a plane. Where no platform is provided, a useful space is formed.

In a further aspect of the invention, the shape of the interconnecting member as viewed from the front takes an inverted U-shaped form, and seats are mounted on top of the interconnecting member. In this case, a space is formed below the interconnecting member. This is convenient for users.

Where the interconnecting member is split into plural parts which are hinged together, the interconnecting member can be folded. This is convenient for transportation.

Still another aspect of the present invention has two platforms mounted over an interconnecting member. The two platforms are spaced from each other horizontally. A box-like battery-accommodating portion of inverted U-shaped cross section is disposed between the two platforms. Electric batteries are accommodated in the battery-accommodating portion. Therefore, one can ride on each platform while straddling the battery-accommodating portion. The batteries are concealed from view. This is favorable from an aesthetical point of view.

An opening is formed in the top surface of the above-described battery-accommodating portion. Batteries are mounted through the opening. Hence, the batteries can be easily mounted and detached.

The batteries can also be mounted in wheels so as to be capable of being horizontally mounted and detached. As a consequence, the spaces in the wheels can be effectively exploited.

The batteries are detachably mounted to the front forks of the frame of the cart. Therefore, it is possible to make effective use of the space. In addition, the batteries do not impede driving operations or getting on and off the cart. A basket for accommodating small objects is mounted to the front forks. The batteries can be detachably mounted to the bottom of the basket.

The frame of the cart is partially or totally made hollow. In particular, the frame has a center frame which is hollow. Batteries can be housed within the center frame. The batteries are concealed from view, in the same way as in the foregoing example. Hence, the space can be effectively utilized.

A still other aspect of the invention lies in a three-wheeled motorized cart having two rear wheels, the cart being characterized in that at least one driving motor is housed in at least one of the two rear wheels. Consequently, the three-wheeled cart is excellent from an aesthetical point of view.

In a yet further aspect of the invention, batteries are housed in the single front wheel of a three-wheeled motorized cart having two rear wheels. A driving motor and other batteries are housed in the two rear wheels, respectively. Therefore, the weight balance between the right and left portions of the cart is enhanced.

In a further feature of the invention, a driving motor and batteries are housed in the single front wheel. This improves the weight balance between the front wheel, which would otherwise be relatively light, and the two rear wheels. Hence, the weight balance between the front and rear portions of the cart is improved.

In a still other feature of the invention, the frame of the cart can be divided into a front portion and a rear portion. This facilitates storing or transporting the frame. Furthermore, the frame of the cart is made foldable, thus facilitating storing and transporting the frame.

A yet other aspect of the invention lies in a golf cart having three wheels including at least one wheel in which a driving motor is housed. Hence, the golf cart has a good appearance. The cart is equipped with a support mechanism which holds golf bags in such a way that the front portions of the bags are elevated. The heads of the installed golf clubs are directed forward. This makes it easy to take in and out the golf clubs.

The golf cart has a platform whose height can be set at will. When the interconnecting member that interconnects the two rear wheels is made higher than the center of height of the rear wheels, the interconnecting member is elevated. This permits the golf cart to go through rough ground surfaces with greater ease. When the interconnecting member is shifted downward from the center of height of the rear wheels, the height of the platform is lowered. This makes it easy for one to get on and off the golf cart.

BRIEF DESCRIPTION OF THE DRAWINGS

Other objects and features of the invention will become apparent from the following detailed description when read with reference to the accompanying drawings, in which;

FIG. 26 is a plan view of a golf cart according to the invention;

DETAILED DESCRIPTION OF THE INVENTION

Figure 1:
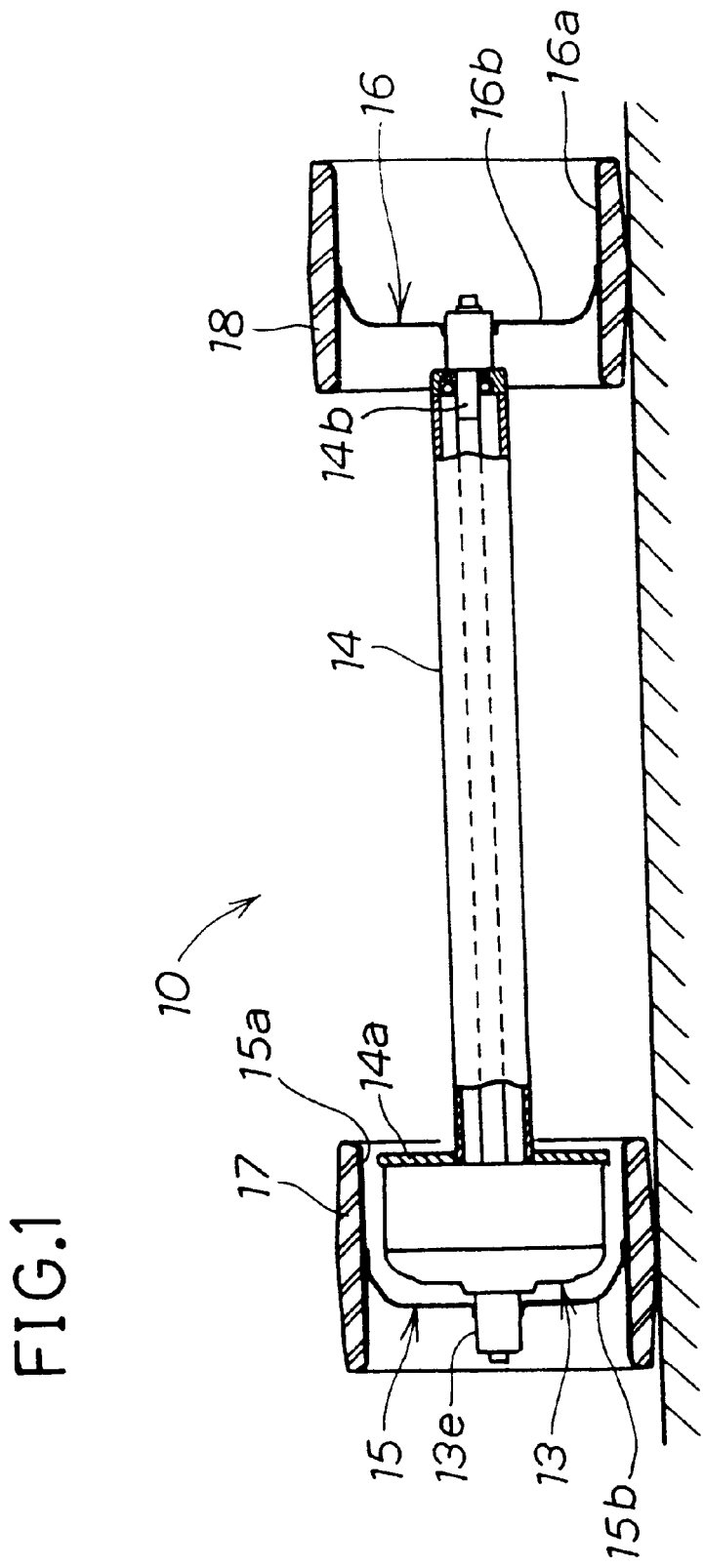
FIG. 1 is a front elevation partially in cross section of a power unit according to the present invention, the power unit being for use with a motorized cart.

Referring to FIG. 1, there is shown a power unit embodying the concept of the present invention. This power unit, generally indicated by reference numeral 10, comprises two wheels 15, 16 for driving a motor-driven cart (not shown in this figure), a driving motor 13 housed in one wheel 15, and an interconnecting member 14. The wheels 15 and 16 are rotatably held to the opposite ends, respectively, of the interconnecting member 14.

The wheel 15 has a cylindrical rim 15a and a wheel disk 15b. Similarly, the wheel 16 has a cylindrical rim 16a and a wheel disk 16b. A tire 17 is mounted to the outer periphery of the rim 15a of one wheel 15. Another tire 18 is mounted to the outer periphery of the rim 16a of the other wheel 16.

The interconnecting member 14 has a flange 14a on the side of one wheel 15. The aforementioned motor 13 is bolted to the flange 14a. This motor 13 has an output shaft 13e which is welded or otherwise mounted to the wheel 15.

The interconnecting member 14, the motor 13, and the wheel 15 are coaxially arranged. Preferably, the interconnecting member 14 is made of a hollow member such as a steel pipe to reduce the weight. The interconnecting member 14 has an axle shaft 14b concentric with and extending through the hollow interconnecting member 14. The axle shaft 14b has one end (left end in FIG. 1) fastened to the output shaft 13e of the driving motor 13 and an opposite end (right end in FIG. 1) on which the other wheel 16 is fixedly mounted.

In this example shown in FIG. 1, the driving motor 13 is housed in the wheel 15 and so the motor 13 is concealed from view. Hence, the cart is excellent from an aesthetical point of view. Any outer space to install the motor 13 is dispensed with. Furthermore, the space inside the wheel can be effectively utilized.

Figure 2:
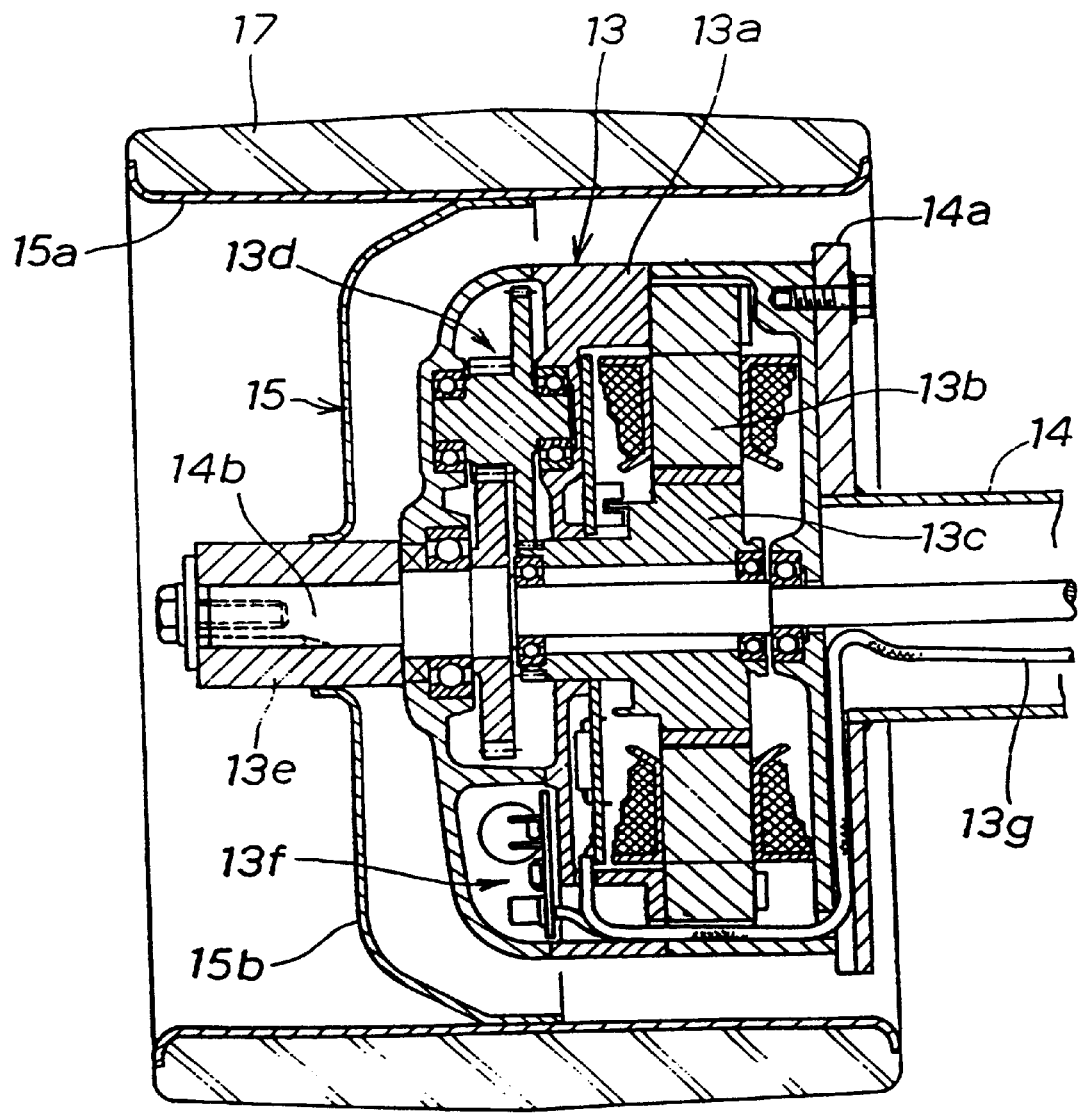
FIG. 2 is a detailed cross-sectional view of one wheel of the cart shown in FIG. 1, and in which a driving motor is housed in the wheel.

FIG. 2 is a detailed cross-sectional view of the wheel 15 in which the motor 13 is housed. The motor 13 comprises a casing 13a bolted to the flange 14a, an annular stator 13b mounted inside the casing 13a, a rotor 13c mounted in the stator 13b and rotatably held to the casing 13a, a reduction mechanism 13d for decelerating the rotation of the rotor 13c, an output shaft 13e for taking output power from the reduction mechanism 13d, and a control circuit portion 13f for controlling the rotational speed of the rotor 13c. Since the output shaft 13e is mounted to the wheel 15, the output power of the driving motor 13 (as being taken out from the output shaft 13e via the reduction mechanism 13d) is directly transmitted to the wheel 15. The output shaft 13e is also secured to one end of the axle shaft 14b, the other end of the axle shaft 14b being fastened to the wheel 16. Thus, the motor output power is also transmitted to the wheel 16 via the axle shaft 14b.

Figure 5:
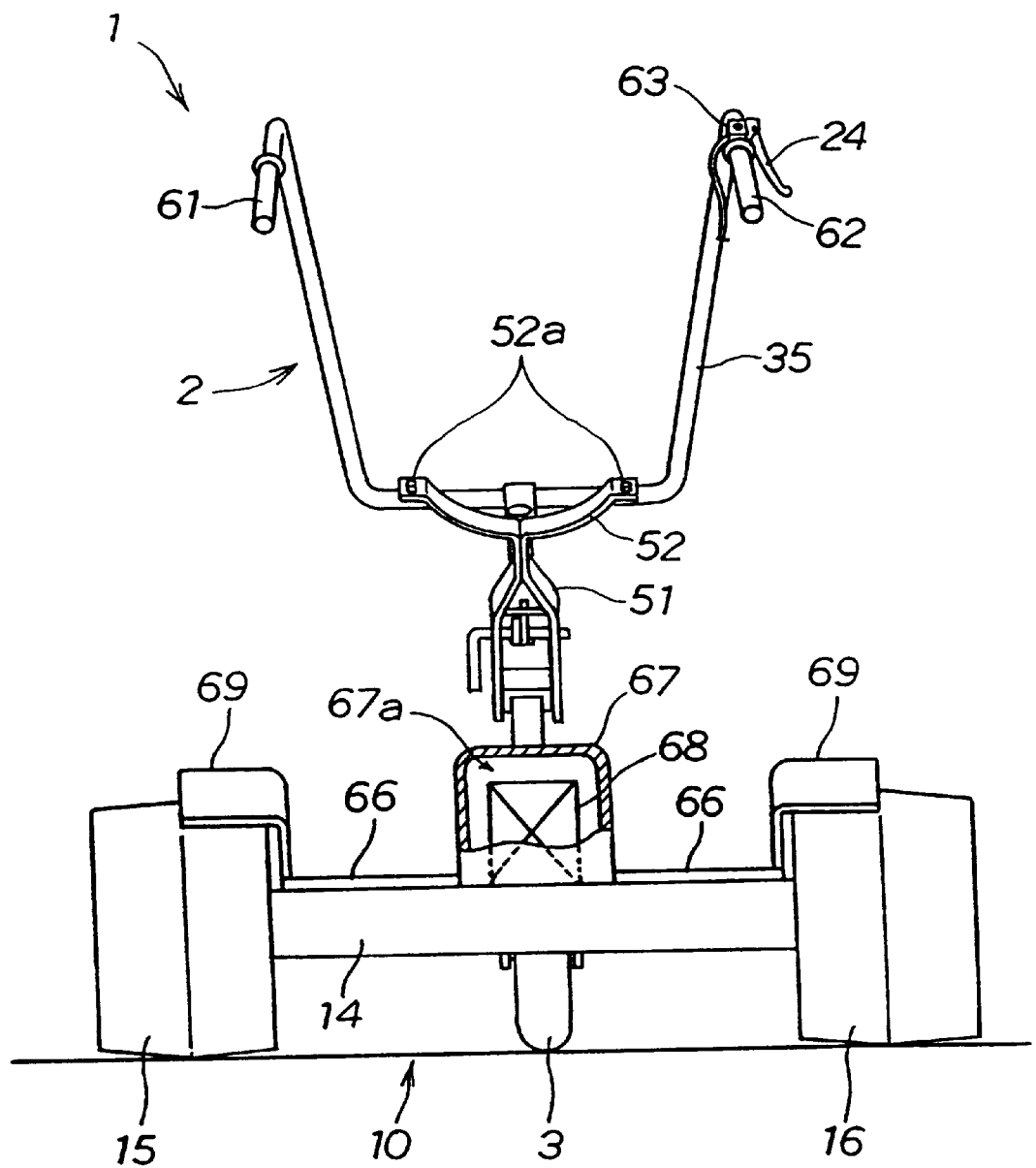
FIG. 5 is a rear view of the golf cart shown in FIG. 4.

Electric wires 13g, shown schematically include signal lines and electric power lines for supplying electric power from batteries 68, with reference also to FIG. 5. The signal lines transmit signals from a right grip (speed control grip) 62 and from a starter switch 63 to the control circuit portion 13f.

Figure 3:
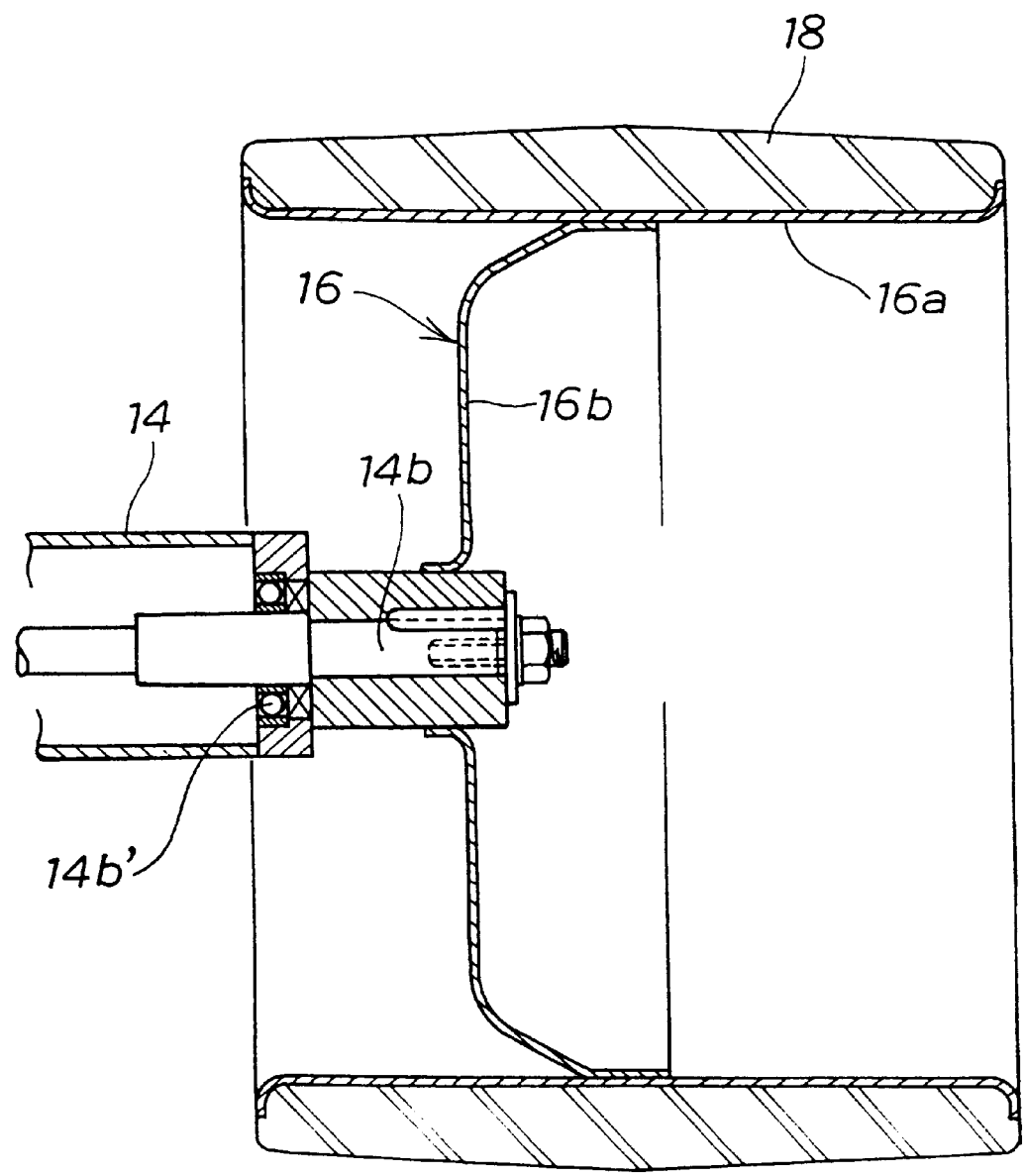
FIG. 3 is a cross-sectional view of the other wheel of the cart shown in FIG. 1.

FIG. 3 is a detailed cross-section of the other wheel 16. This wheel 16 is fastened to the right end of the axle shaft 14b. The right end portion of the axle shaft 14b is rotatably supported by the end of the interconnecting member 14 via a bearing 14b' so that the wheel 16 can rotate relative to the interconnecting member 14. The interconnecting member 14 and the wheel 16 are coaxially mounted.

Figure 4:
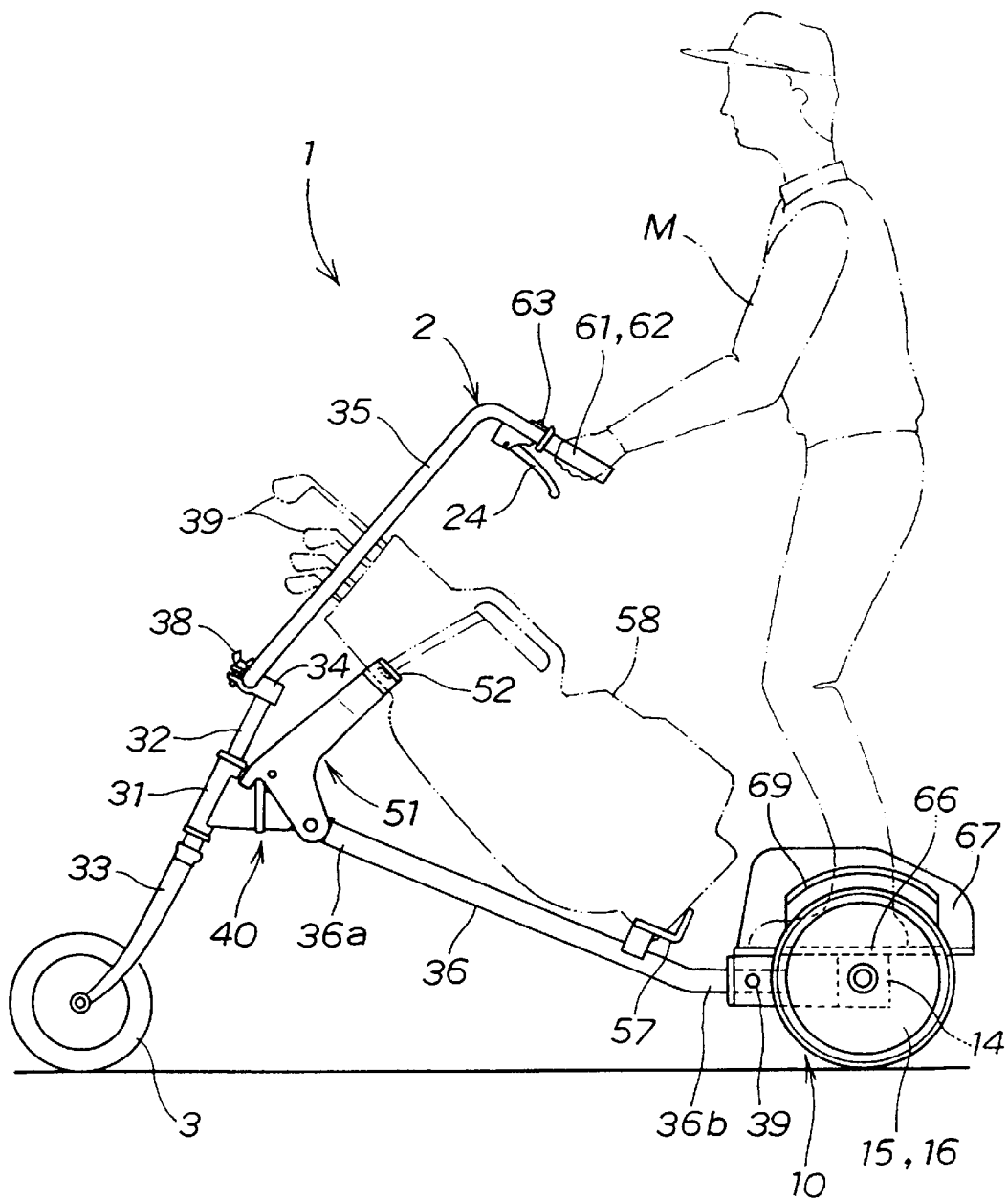
FIG. 4 is a side elevation of a golf cart on which the power unit shown in FIG. 1 is mounted.

FIG. 4 is a side elevation, illustrating an example in which the novel power unit 10 is mounted on an electric three-wheeled vehicle that is a golf cart.

This golf cart, generally indicated by reference numeral 1, has a cart frame 2, a single front wheel 3, and two rear wheels 15 and 16 which are horizontally spaced from each other. The front wheel 3 and the two rear wheels 15, 16 are mounted to the frame 2.

The frame 2 comprises a front steering head (head pipe) 31, an upper steering post 32 rotatably mounted to the steering head 31, lower front forks 33, a steering bar 35 mounted to the top of the steering post 32 by a steering lug 34, a center frame 36 having a rear portion 36b, and the aforementioned interconnecting member 14 which constitutes a rear frame. The interconnecting member 14 is detachably mounted to the rear portion 36b of the center frame 36, which is in turn mounted to the back of the steering head 31 by a folding mechanism 40. The center frame 36 is so shaped that it is inclined rearwardly and downwardly.

The steering post 32 and the front forks 33 are interconnected. The above-described front wheel 3 is rotatably mounted to the bottoms of the front forks 33. The steering lug 34 has a bolt 38 equipped with a knob. The central portion of the steering bar 35 is held against the top of the steering post 32 by tightening the bolt 38. The steering bar 35 is allowed to be swung back and forth by loosening the bolt 38.

The rear portion 36b of the center frame 36 made of a round pipe is inserted into the front end portion of the interconnecting member 14 of the power unit 10. The rear portion 36b is fixed to the interconnecting member 14 with a bolt 39. The center frame 36 has a front support portion 51 and a rear support portion 57. The front support portion 51 acts also as a part of the folding mechanism 40. These support portions 51 and 57 sustain a golf bag 58 as indicated by the phantom line in FIG. 4. The front support portion 51 assumes an L-shaped form as viewed from one side. The front support portion 51 has a bag support portion 52 at its top end. The rear support portion 57 assumes an inverted L-shaped form as viewed from one side so as to accept the corners of the bottom of the golf bag 58.

Therefore, the golf bag 58 is placed on the golf cart 1 such that the front side of the bag is raised along the inclined surface of the center frame 36. Since the top portion of the bag 58 faces forward, the heads of plural golf clubs 39 accommodated in the golf bag 58 inevitably face forward. Because the front support portion 51 is located at a higher level than the rear support portion 57, the front side of the golf bag 58 is raised further.

Referring again to FIG. 5, the golf cart 1 has two opposite platforms 66 on top of the power unit 10 for the electric cart.

A box-like battery-accommodating portion 67 is disposed between the two opposite platforms 66. Electric batteries 68 are housed in the battery-accommodating portion 67.

The bag support portion 52 takes an arc-shaped form whose top side is open. The bag support portion 52 has two opposite end portions provided with slots 52a, respectively, in which the belts of the golf bags or the like are caught. Rear wheel covers 69 are mounted to the two opposite platforms 66, respectively.

Figure 6:
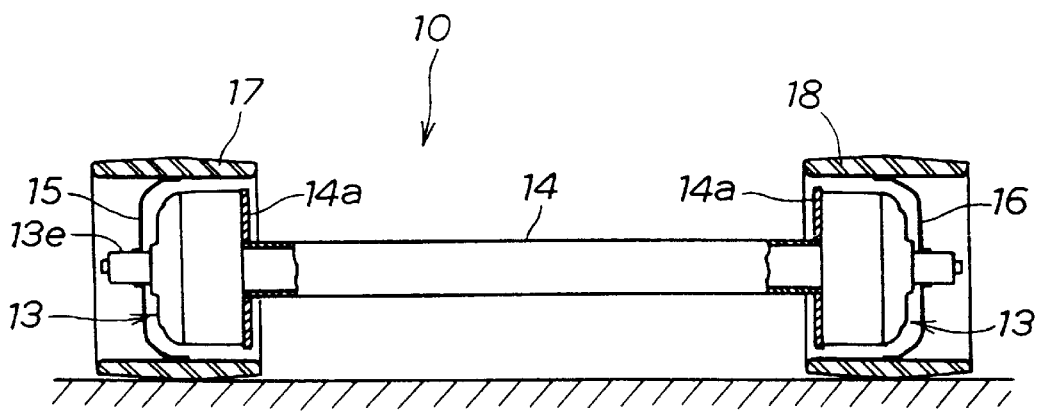
FIG. 6 is a front elevation partially in cross section of another power unit according to the present invention, the power unit being for use with a motorized cart.

Referring next to FIG. 6, there is shown another power unit for use with a motorized cart. This power unit, generally indicated by reference numeral 10, is characterized in that driving motors 13 are housed in two wheels 15 and 16, respectively. Therefore, this power unit having the two motors 13 produces a larger output power than the power unit having a single motor. Furthermore, this power unit can be made smaller in size.

In this example, the two driving motors 13 are employed. Since the two motors 13 are concealed from view, the power unit is excellent from an aesthetical point of view.

Because the motors 13 are mounted in the wheels 15 and 16, respectively, the center of gravity lies between the two wheels 15 and 16, thus improving the balance. Where this power unit is installed on a motorized three-wheeled vehicle such as a golf cart, excellent operating characteristics are obtained. Additionally, because the two wheels 15 and 16 are separately but synchronously driven by the associated driving motors 13, 13, an axle shaft such as the one 14b used in the embodiment shown in FIGS. 1–3 can be omitted.

Figure 7:
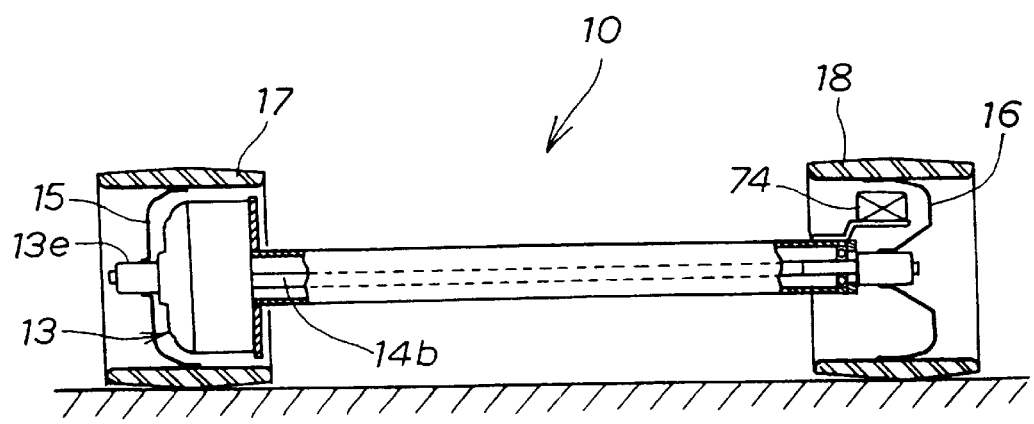
FIG. 7 is a front elevation partially in cross section of a further power unit according to the present invention, the power unit being for use with a motorized cart.

Referring next to FIG. 7, there is shown a further power unit according to the invention. This power unit, also indicated by reference numeral 10, is characterized in that a driving motor 13 is housed in one wheel 15, and that batteries 74 are housed in the other wheel 16. In this example, therefore, neither the motor 13 nor the batteries 74 are exposed. Hence, this power unit has a good appearance. The spaces in the wheels can be effectively utilized. Furthermore, the weight balance between the two opposite wheels is improved.

Figure 8A:
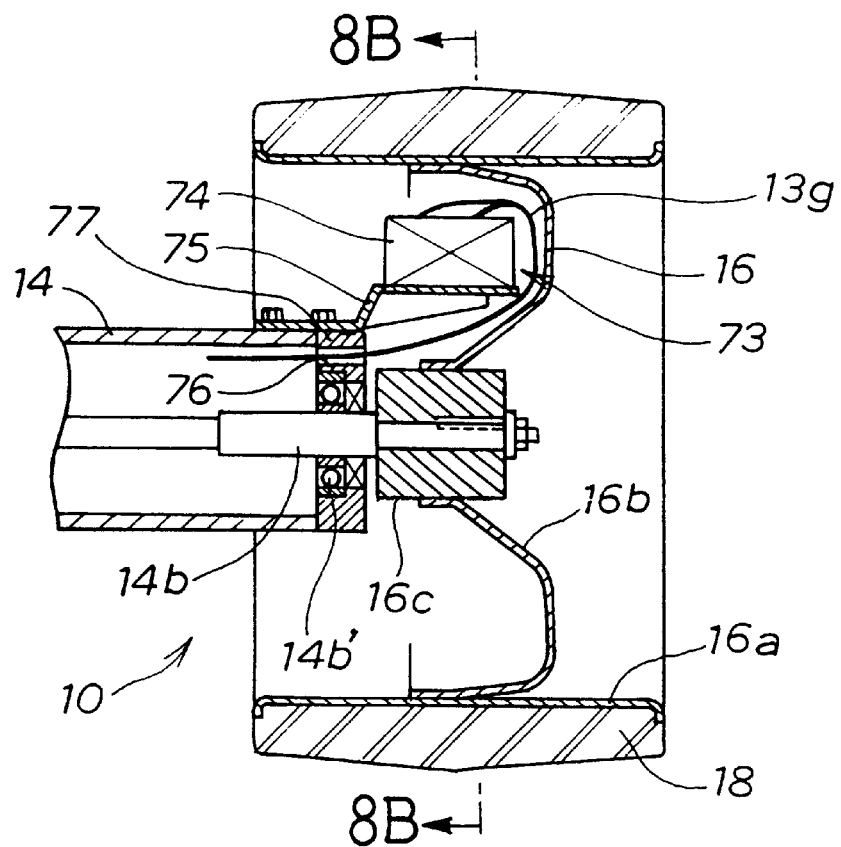
FIG. 8A is a cross-sectional view of a wheel in which the batteries shown in FIG. 7 are housed.
Figure 8B:
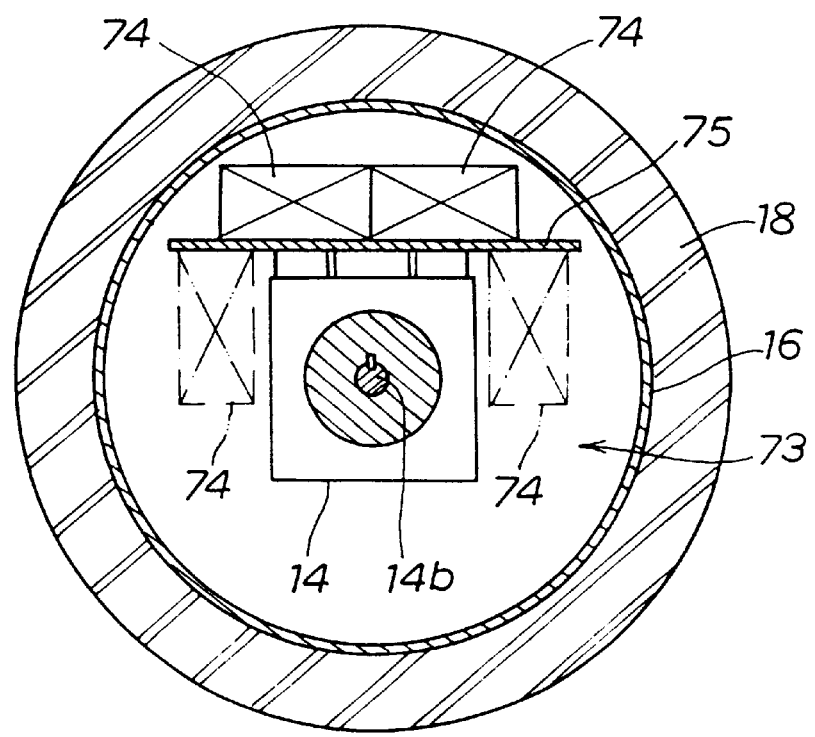
FIG. 8B is a cross-sectional view taken along line 8B—8B of FIG. 8A.

FIGS. 8A and 8B are cross-sectional views of the other wheel 16 shown in FIG. 7. FIG. 8B is a cross-sectional view taken along line 8B—8B of FIG. 8A.

Referring to FIG. 8A, the wheel 16 has a wheel disk 16b. A recessed portion 73 is formed inside the wheel disk 16b. The batteries 74 are detachably mounted in the recessed portion 73. The batteries 74 and the driving motor 13 (FIG. 2) are electrically connected by wires 13g extending longitudinally through the hollow interconnecting member 14 without interference with the axle shaft 14b. An opening 76 in an end plate 77 of the interconnecting member 14 is provided for the passage of the wires 13g.

A bracket 75 is used to mount the batteries 74 to the interconnecting member 14. The wheel disk 16b provided with the recessed portion 73 may also be located below the interconnecting member 14 in a manner not illustrated, and the batteries 74 may be mounted in the recessed portion 73. Furthermore, as indicated by the phantom lines in FIG. 8B, the batteries 74 may depend from the bracket 75.

Figure 9A:
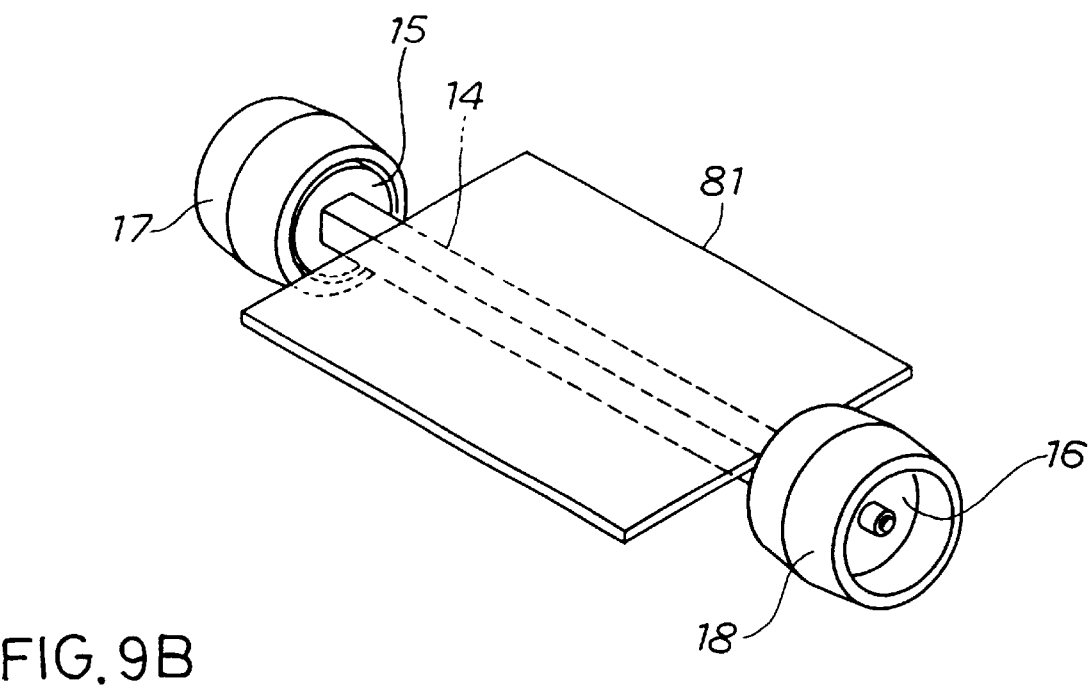
FIG. 9A is a perspective view of a still other power unit according to the invention.
Figure 9B:
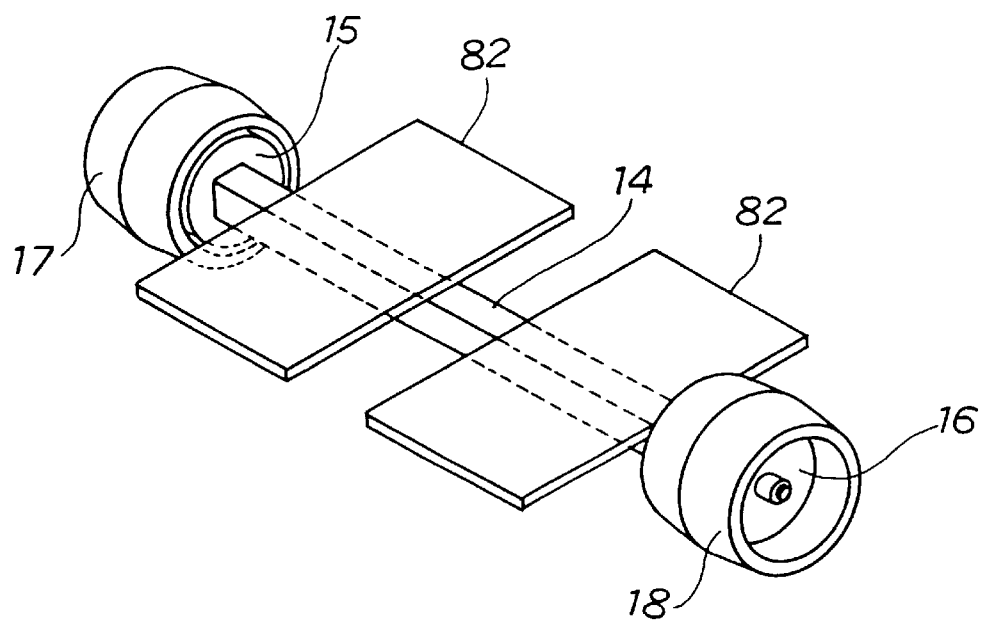
FIG. 9B is a perspective view of a modification of the power unit shown in FIG. 9A.

FIG. 9A shows a platform arrangement according to the invention. FIG. 9B shows a modification of the platform arrangement shown in FIG. 9A.

Referring to FIG. 9A, an interconnecting member 14 is a rod-like member typified by a rectangular pipe. A platform 81 in the form of a flat board is mounted on top of the interconnecting member 14. Persons can stand on the platform 81. In addition, objects can be carried on the platform 81.

In FIG. 9B, platforms 82 are horizontally spaced from each other. Consequently, the space between the platforms 82 can be effectively utilized.

Figure 10A:
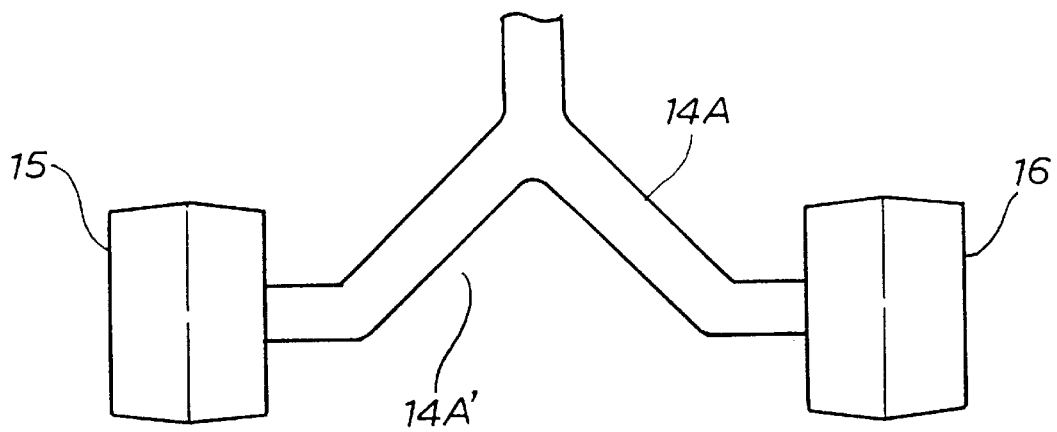
FIGS. 10A and 10B are plan views of yet other power units according to the invention.
Figure 10B:
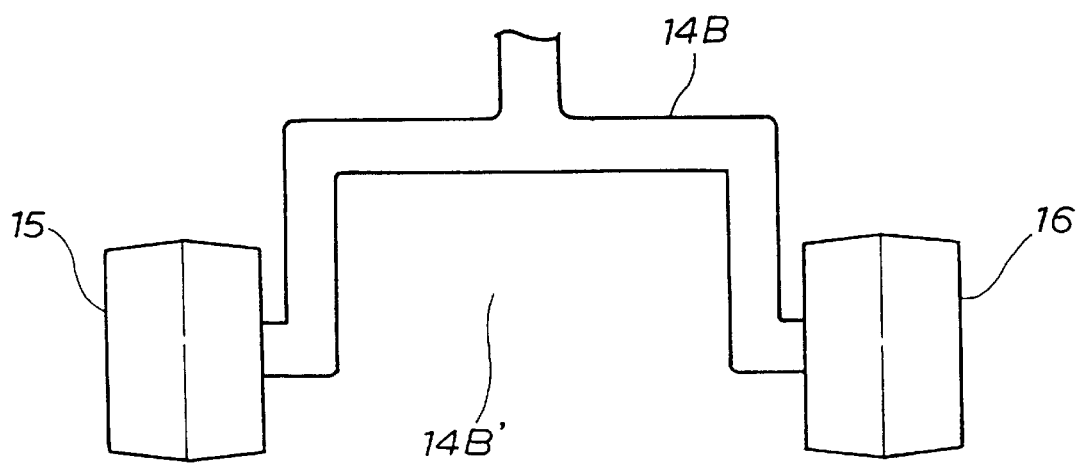

Referring to FIGS. 10A and 10B, there are shown other modifications of the interconnecting member.

Referring to FIG. 10A, two portions of an interconnecting member 14A extend from the inner surfaces, respectively, of two wheels 15 and 16 forwardly and inwardly and meet. The interconnecting member 14A is shaped like the letter "Y" in the plane where the interconnecting member is connected with the main frame (not shown). In this example, therefore, a usable space 14A' is formed between the two wheels 15 and 16. Where platforms are mounted over the interconnecting member 14A, the platforms can be stably mounted.

Referring next to FIG. 10B, two portions of an interconnecting member 14B extend forwardly from the inner surfaces of two wheels 15 and 16, respectively, and are bent at right angles inwardly. The meeting portions of the interconnecting member 14B are connected to the main frame (not shown). In this example, therefore, a broader space 14B' is available. Where platforms are mounted over the interconnecting member 14B, the platforms can be mounted stably.

Figure 11A:
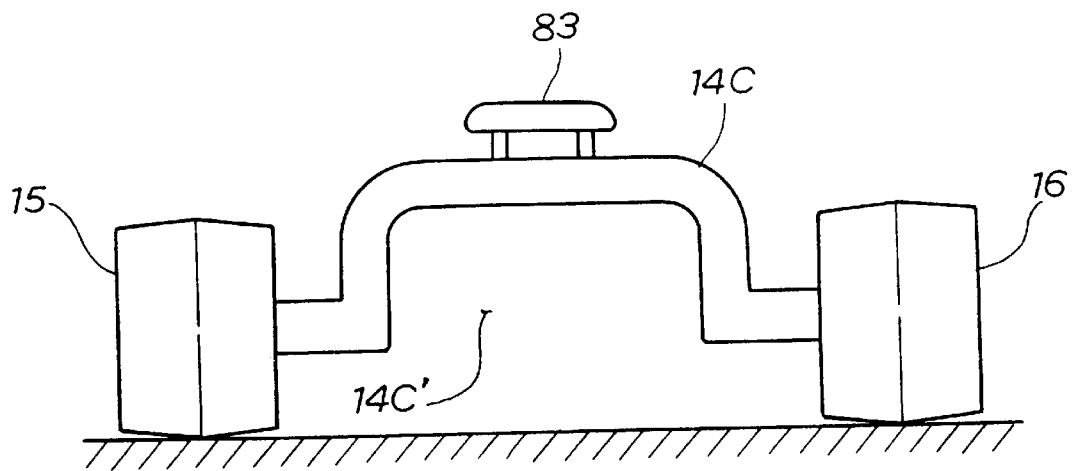
FIGS. 11A and 11B are front elevations of still further power units according to the invention.
Figure 11B:
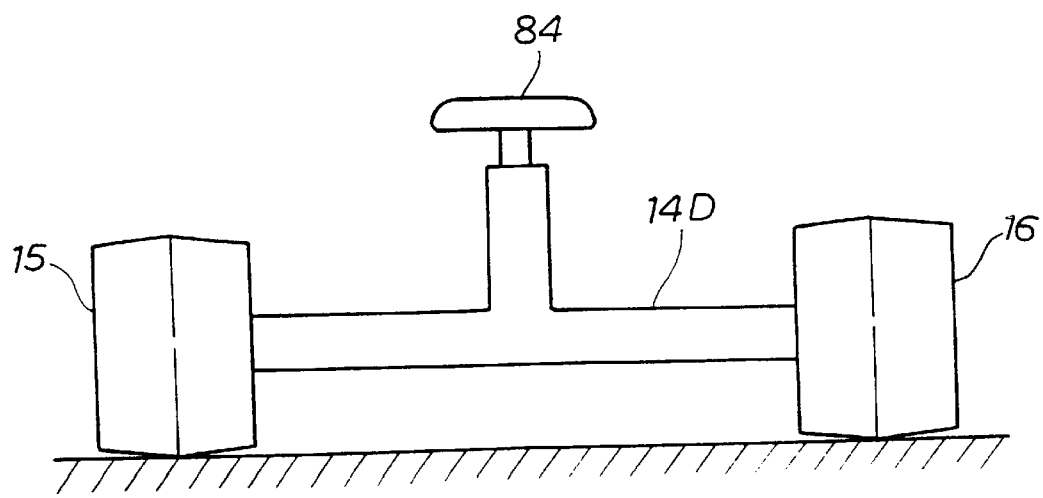

Still further interconnecting member arrangements according to the invention are shown in FIGS. 11A and 11B.

Referring to FIG. 11A, two portions of an interconnecting member 14C extend from the inner surfaces of two wheels 15 and 16, respectively, and protrude upward. Thus, the interconnecting member 14C takes an inverted U-shaped form. A seat 83 is mounted over the interconnecting member 14C. Therefore, a rider or a golf player can sit on this seat 83. A space 14C' is formed by the interconnecting member 14C and can be used.

Referring next to FIG. 11B, and interconnecting member 14D assumes an inverted T-shaped form as viewed from the front. A seat 84 is mounted over the interconnecting member 14D. As a consequence, the interconnecting member 14D is simple in structure and easy to manufacture.

Figure 12A:
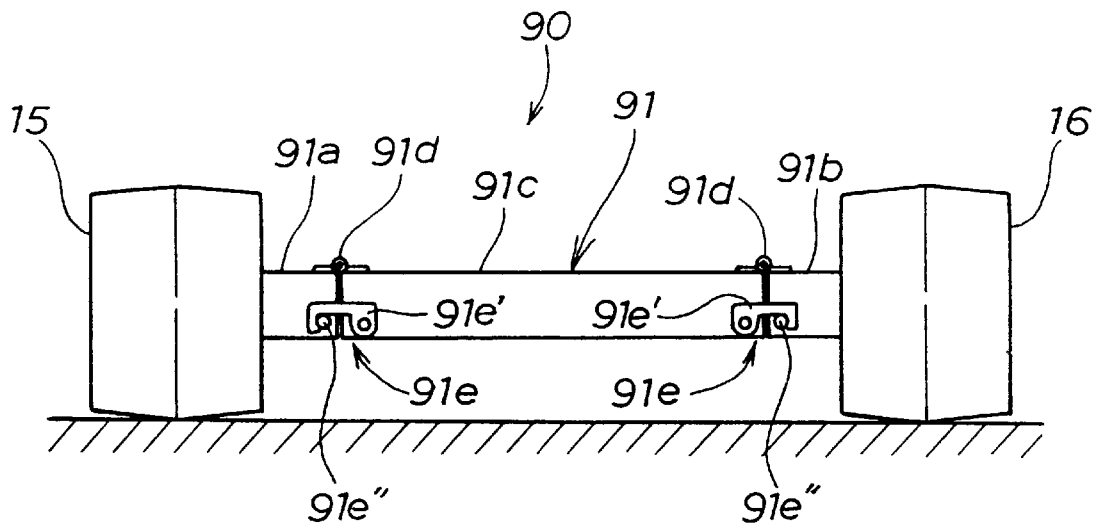
FIGS. 12A and 12B are front elevations of yet further power units according to the invention.
Figure 12B:
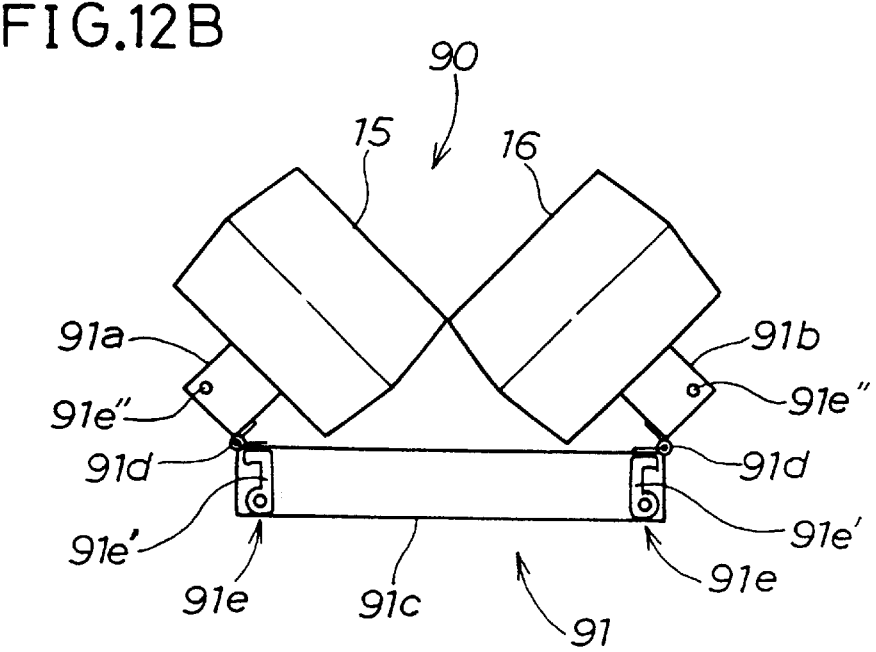

FIGS. 12A and 12B show yet further interconnecting member arrangements according to the invention. These arrangements, generally indicated by reference numeral 90, are capable of being folded.

Referring to FIG. 12A, the arrangement 90 has two wheels 15, 16, and an interconnecting member 91. The two wheels 15 and 16 are rotatably mounted to the opposite ends of the interconnecting member 91. The interconnecting member 91 has end portions 91a and 91b to which the wheels are directly mounted, a central base portion 91c, hinges 91d connecting the base portion 91c so as to be swingable relative to the end portions 91a and 91b, and hooked locking means 91e for inhibiting swinging movement of the end portions 91a and 91b relative to the base portion 91c.

The arrangement 90 constructed as described above is folded in the manner described below. In FIG. 12A, the locking means 91e prevents the end portions 91a and 91b of the interconnecting member 91 from making swinging movement relative to the base portion 91c. When the arrangement 90 should be folded, a hook 91e' is disengaged from an engaging pin 91e", thus causing the locking means 91e to unlock the end portions 91a and 91b.

In FIG. 12B, the hinges 91d are mounted on top of the interconnecting member 91. Therefore, the wheels 15 and 16 can be folded upward. The hinges 91d may also be mounted to the bottom of the interconnecting member 91. In this case, the wheels 15 and 16 may be folded downward.

Figure 13A:
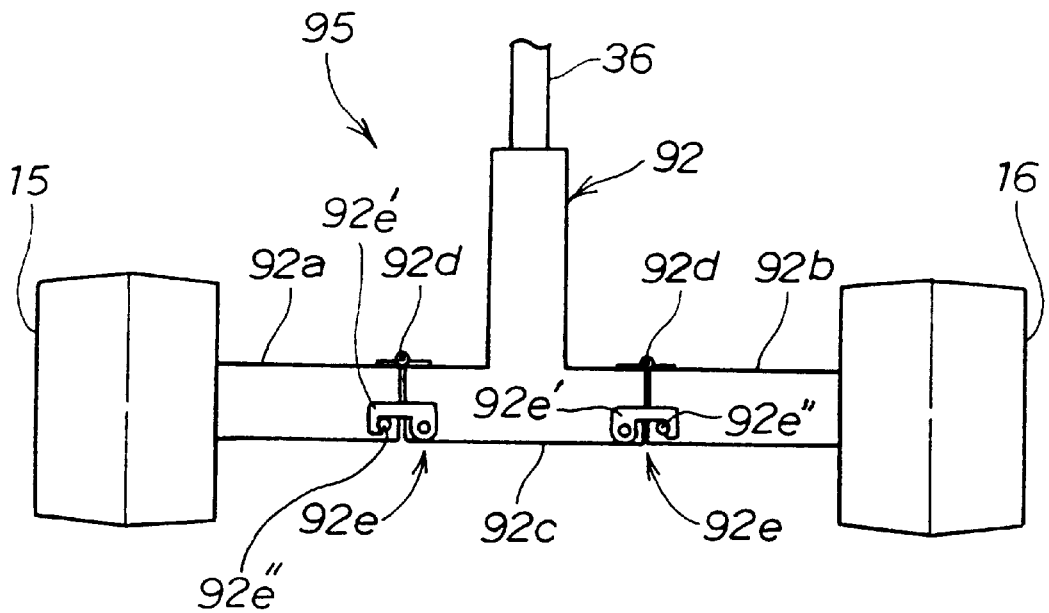
FIGS. 13A and 13B are top views of a mechanism for folding an interconnecting member in accordance with the invention.
Figure 13B:
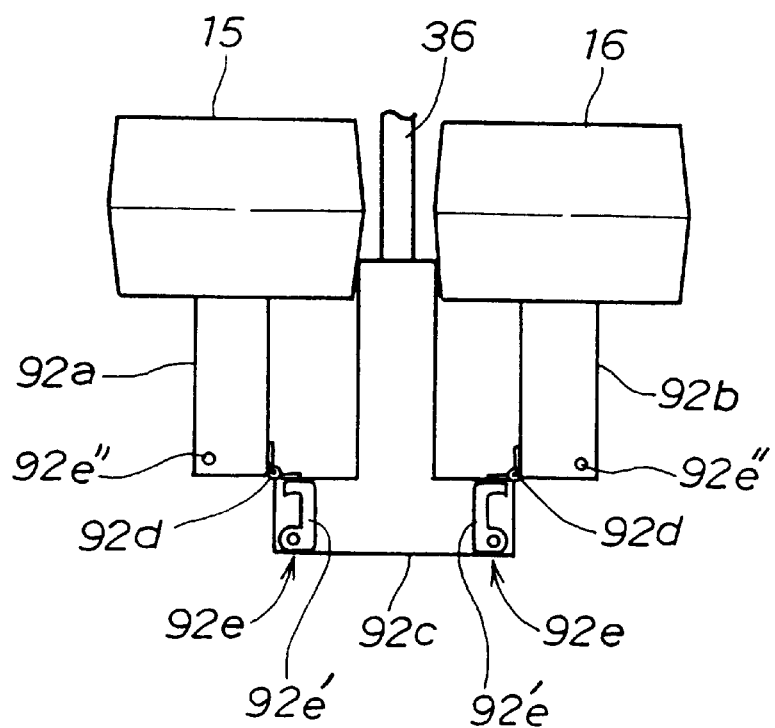

FIGS. 13A and 13B are top views of a modification of the mechanism for folding the interconnecting member shown in FIG. 12A. The components of the arrangement 95 are essentially the same as those of the arrangement shown in FIG. 12A. When the interconnecting member is folded, a hook 92e' is disengaged from an engaging pin 92e", thus causing the locking means 92e to unlock the end portions. Since hinges 92d are mounted in front of the interconnecting member 92, wheels 15 and 16 are folded at sides of the center frame 36, as shown in FIG. 13B. The hinges 92d may also be mounted to the rear side of the interconnecting member 92, and the wheels 15 and 16 may be folded rearwardly. Preferably, the interconnecting member 92 is equipped with temporarily locking means to prevent the wheels 15 and 16 from quivering when the interconnecting member is folded.

In the embodiments shown in FIGS. 10A and 10B, FIGS. 11A and 11B, FIGS. 12A and 12B, and FIGS. 13A and 13B, because the interconnecting members 14; 91; 92 have a bent structure (FIGS. 10A–11B) or a hinged foldable structure (FIGS. 12A–13B), the driving motor 13 is preferably housed in both wheels 15, 16 in the same manner as shown in FIG. 6, so that the axle shaft 14b extending through the interconnecting member 14; 91; 92 to interconnect both wheels 15, 16, such as shown in FIGS. 1–3, can be omitted. Alternatively, in the case where the driving motor 13 is housed in only one wheel 15 or 16, the interconnecting member 14; 91; 92 includes an axle shaft (not shown) extending through the interconnecting member 14; 91; 92 to transmit power of the driving motor to both wheels 15, 16. Since the interconnecting members 14; 91; 92 have bent portions (FIGS. 10A–11B) or hinged portions (FIGS. 12A–13B) as described above, the axle shaft is preferably comprised of a single flexible shaft (generally known per se) or a plurality of axle shaft portions joined together end to end by a universal joint (generally known per se) located at a position where the interconnecting member 14; 91; 92 is bent or hinged. Wires 13g (see FIG. 2) interconnecting the control circuit portion 13f (FIG. 2) in the driving motor 13 and the batteries 68 (FIG. 5), speed control grip 62 (FIG. 5) and starter switch 63 (FIG. 5) are running through at least a portion of the interconnecting member 14; 91; 92.

The application of novel power units for motorized carts is not limited to golf carts as in the illustrated examples. The novel power units can also be applied to transportation vehicles, maintenance vehicles, and various kinds of carts.

A structure for mounting the batteries 68 is next described as one example of the invention. As described already in connection with FIG. 5, the box-like battery-accommodating portion 67 of inverted U-shaped cross section is mounted on the power unit 10 between the two opposite platforms 66. The inside of this battery-accommodating portion 67 is used as a space 67a for holding batteries 68. Since the batteries 68 are housed in the battery-accommodating portion 67, they are concealed from view. Hence, the golf cart has an excellent appearance. Because the battery-accommodating portion 67 is disposed between the platforms 66, a person can sit straddling the battery-accommodating portion 67 with his feet on the platforms 66. Hence, the spaces between the feet can be effectively utilized.

Figure 14:
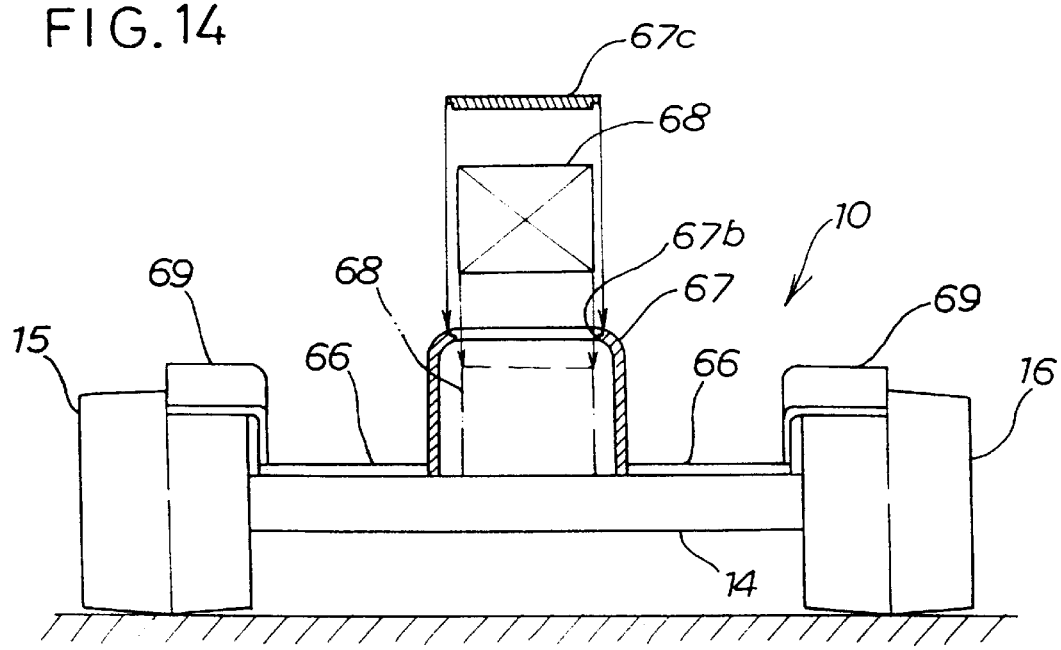
FIG. 14 is a rear view of a structure for mounting batteries according to the invention.

Referring next to FIG. 14, assuming a motor, for example, is located in a front wheel of power unit 10, there is shown another example of structure for mounting batteries. In this example, an opening 67b is formed at the top of the battery-accommodating portion 67. The batteries 68 are introduced into the battery-accommodating potion 67 through the opening 67b. Accordingly, the batteries 68 are confined within the battery-accommodating portion 67. Hence, the golf cart has an excellent appearance. Since the batteries 68 can be introduced and withdrawn through the opening 67b at the top of the battery-accommodating portion 67, the mounting and detaching operations can be easily performed. A cover 67c may be placed over the opening 67b in the battery-accommodating portion 67 to improve the appearance.

Figure 15:
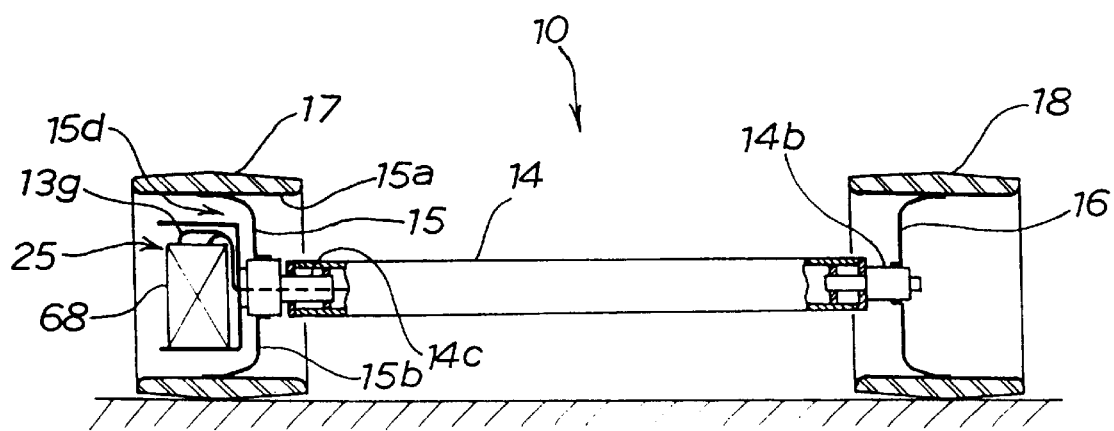
FIG. 15 is a cross-sectional view of another structure for mounting batteries according to the invention.

Referring next to FIG. 15, assuming a motor, for example, is located in the front wheel of power unit 10, there is shown a further example of structure for mounting batteries. In this example, a battery-accommodating portion 25 is formed inside one wheel 15. The batteries 68 are accommodated in the battery-accommodating portion 25. The wheel 16 is rotatably mounted via bearings to a hollow stationary shaft 14c of an interconnecting member 14. Wires 13g for supplying electric power from the batteries 68 to the power unit 10 are running through at least a portion of the hollow interconnecting member 14. The outer surface of the disk 15b of the wheel 15 is provided with a recess 15d into which the batteries 68 can be inserted by moving them horizontally. The other wheel 16 is rotatably mounted to a stationary shaft 14b of the interconnecting member 14. Since the batteries 68 are housed in the recess 15d formed inside the wheel 15, the batteries 68 are not exposed. Consequently, the cart is excellent from an aesthetics point of view. Furthermore, the inside of the wheel 15 can be effectively utilized. Space in which the batteries would otherwise normally be installed is usable for other purposes. Moreover, the center of the gravity of the golf cart which is a motorized cart is lowered. This adds to the stability of the body of the cart.

Figure 16:
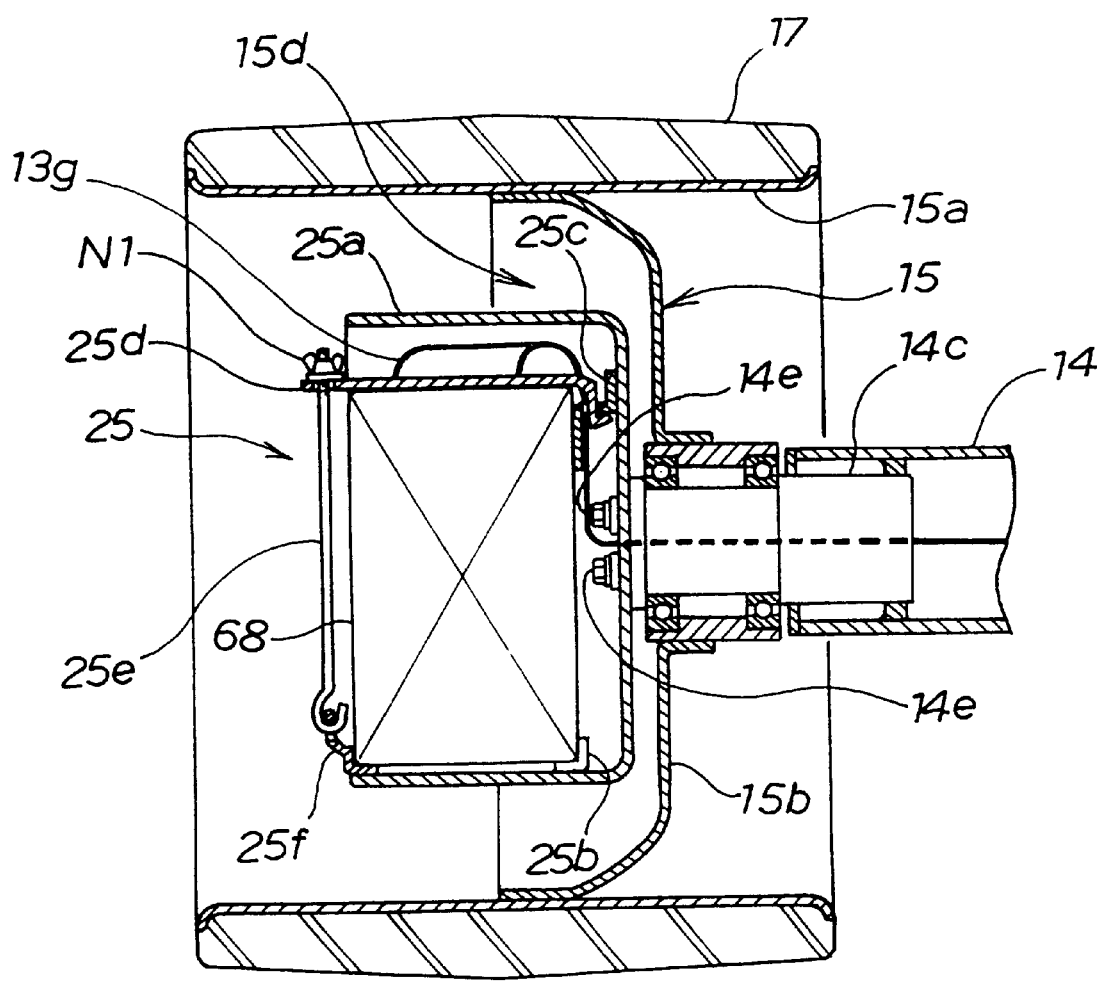
FIG. 16 is a cross-sectional view of a wheel in which batteries are housed.

FIG. 16 is a detailed cross-sectional view of a wheel in which the batteries shown in FIG. 15 are housed. A battery-accommodating portion 25 comprises an accommodating box 25a, four metallic corner fixing elements 25b (only one is shown), a metallic fixing element 25c for holding the top surfaces of the batteries 68, a clamper 25d, a metallic tying element 25e, and a metallic engaging element 25f located under the accommodating box 25a. This accommodating box 25a is mounted to the stationary shaft 14c of the interconnecting member 14 by bolts 14e, and is provided with an opening at its one side. The corner fixing elements 25b act to support the batteries 68 positioned in the box 25a. One end of the clamper 25d engages with the fixing element 25c and holds down the top surfaces of the batteries 68. The tying element 25e has a screwed portion which is mounted to the top of the clamper 25d with a butterfly nut N1. The tying element 25e has a hook at its bottom. The engaging element 25f engages and anchors the hook of the tying element 25e.

The batteries 68 are mounted in the recess 15d formed in the wheel 15 so as to be withdrawable by moving the batteries horizontally because of the above-described structure of the battery-accommodating portion 25. The shape of the accommodating box 25a is not limited to the illustrated box-like form. It may assume an L-shaped form in cross section. In brief, the box can assume any desired form as long as it sustains the weight of the batteries 68.

Figure 17:
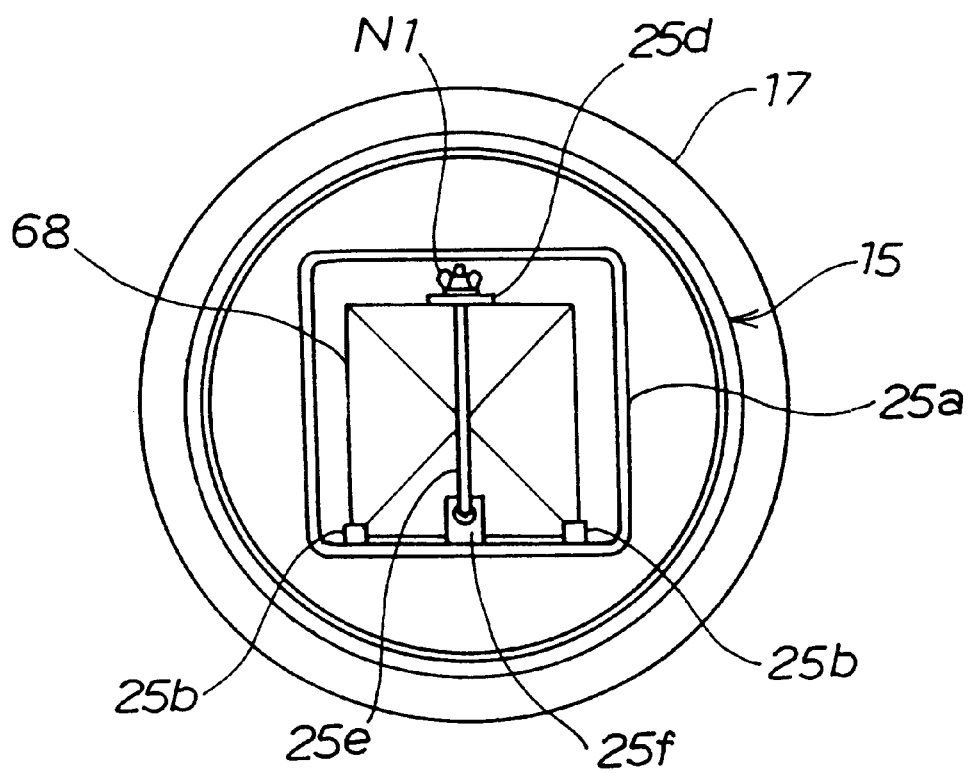
FIG. 17 is a side elevation of the wheel of FIG. 16.

FIG. 17 is a side elevation of FIG. 16. The accommodating box 25a assumes a rectangular box-like form. The batteries 68 are accommodated inside the box 25a. The four corners of the bottom of each battery 68 are placed in position by the corner fixing elements 25b (the rear two are not shown). The top surfaces of the batteries 68 are held down by the clamper 25d so that the batteries 68 are locked. The batteries 68 are shown to be rectangular. If the batteries are circular, then a greater volume is obtained. In this case, the capacity of the batteries 68 can be increased.

Figure 18:
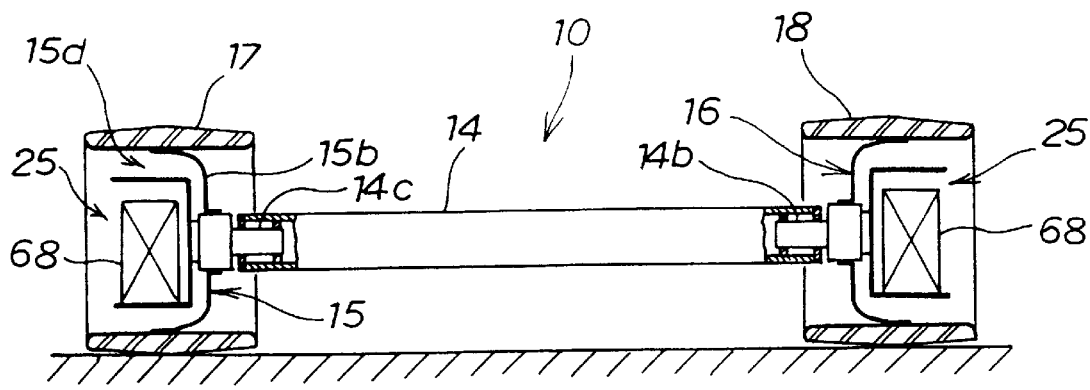
FIG. 18 is a cross-sectional view of a further structure for mounting batteries according to the invention.

Referring to FIG. 18, assuming a motor, for example, is located in a front wheel of power unit 10, there is shown a still other example of structure for mounting batteries. In this example, two wheels 15 and 16 are provided with battery-accommodating portions 25, respectively, for accommodating batteries 68, respectively. The wheel 16 in which the batteries 68 are housed has the same structure as the wheel shown in FIG. 16. In this example, therefore, the two batteries 68 are not exposed and so the appearance is good. Furthermore, space in which the batteries 68 would normally be accommodated is available for other purposes. In addition, the spaces inside the wheels 15 and 16 can be effectively utilized. Moreover, the center of gravity of the golf cart which is a motorized cart is lowered. Since the center of gravity is located midway between the wheels 15 and 16, the weight balance between the wheels 15 and 16 is improved. This adds to the stability of the motorized cart. Additionally, a power capacity larger than a capacity obtained when only one battery 68 exists is obtained. For the same capacity, the power unit 10 can be reduced in size.

Figure 19:
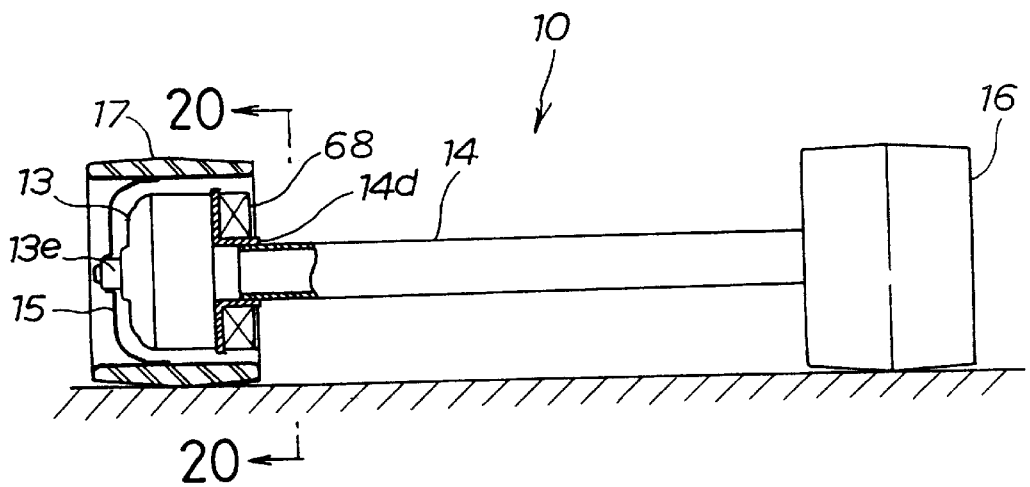
FIG. 19 is a cross-sectional view of a still other structure for mounting batteries according to the invention.

Referring next to FIG. 19, there is shown a yet further example of structure for mounting batteries. In this example, a driving motor 13 and batteries 68 are housed in both wheels 15, 16 (only one motor 13 housed in the wheel 15 being shown for convenience of explanation). The motor 13 is bolted to the flange 14d of the interconnecting member 14 at each end of the interconnecting member 14. The batteries 68 are mounted to the flange 14d of the interconnecting member 14 at each end of the interconnecting member 14. The batteries 68 are mounted to the flange 14d on the opposite side of the motor 13 inside the wheel 15 (16). The driving motor 13 and batteries 68 may be accommodated within only one of the wheels 15, 16, in which instance an axle shaft is used to transmit power of the driving motor 13 to the opposite wheels 15, 16, as in the manner shown in FIGS. 1–3.

In this example, the motor 13 and batteries 68 are housed in the wheels 15, 16. Therefore, they are concealed from view. Hence, the appearance of the cart is excellent from an aesthetical point of view. Moreover, space in which the batteries 68 would normally be accommodated is available for other purposes. In addition, the space inside the wheel 15 can be effectively utilized. Similar advantages can be obtained if the driving motor is accommodated in one wheel and if batteries are mounted around the motor.

Figure 20:
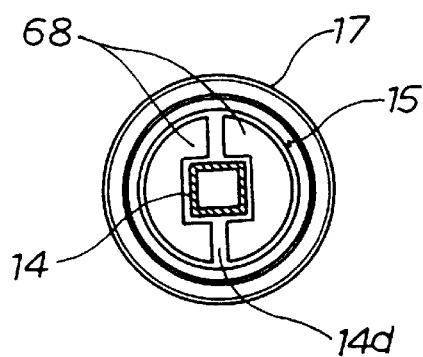
FIG. 20 is a cross-sectional view taken along line 20—20 of FIG. 19.

FIG. 20 is a cross-sectional view taken along line 20—20 of FIG. 19. Batteries 68 each assume a substantially semicircular form. The batteries 68 are mounted inside the wheel 15 and located on opposite sides of the interconnecting member 14. Because of this structure, the narrow space inside the wheel 15 can be utilized most effectively.

Figure 21:
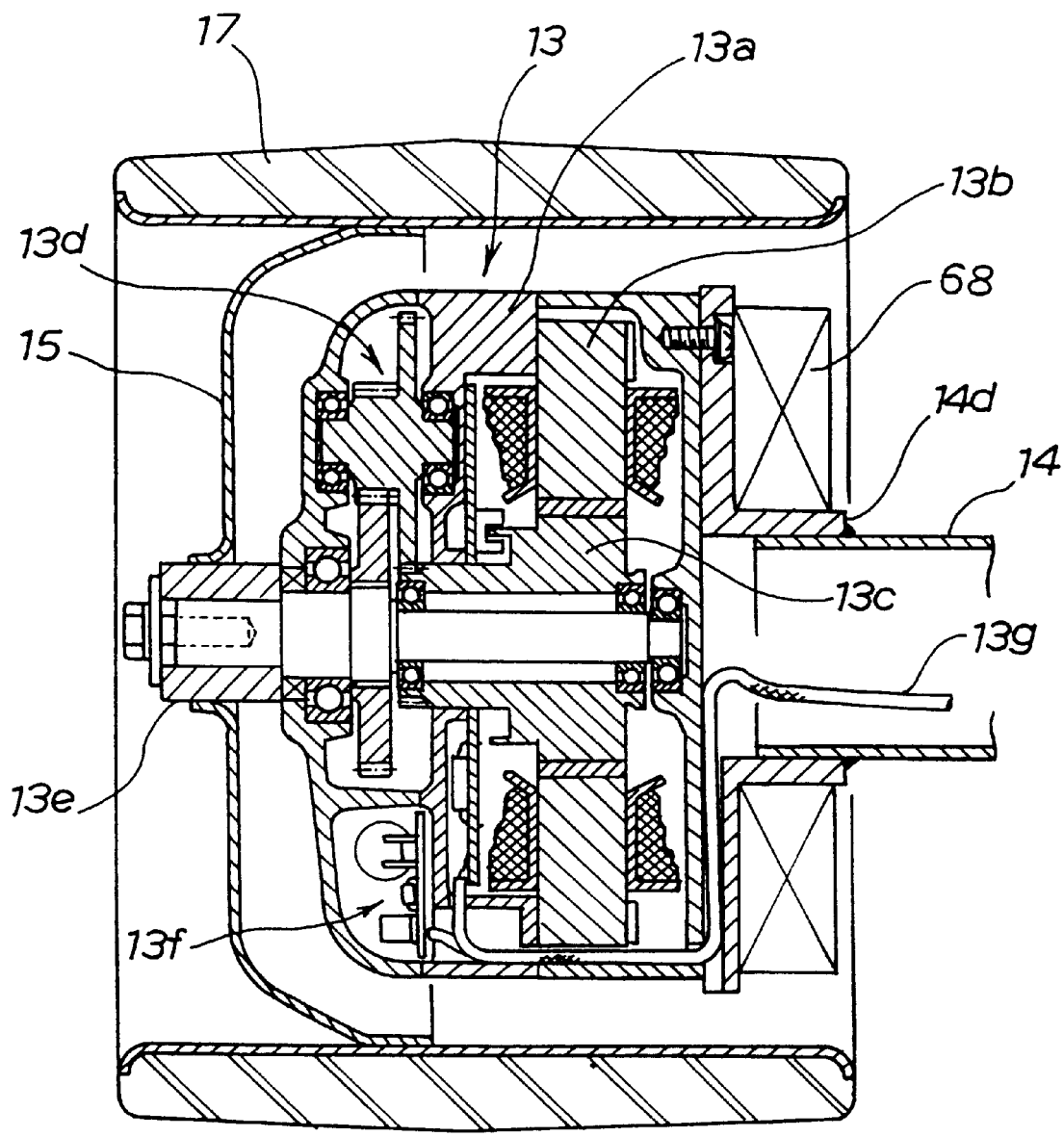
FIG. 21 is a detailed cross-sectional view of a wheel in which a driving motor and batteries are housed according to the invention.

FIG. 21 is a detailed cross-sectional view of the wheel shown in FIG. 19. The driving motor 13 (FIG. 19) and batteries 68 are housed in this wheel 15. The motor 13 is similar in structure to the motor shown in FIG. 2, except that the output shaft 13e of the driving motor 13 housed in the wheel 15 is attached to the wheel 15 only, and an axle shaft 14b (FIG. 2) interconnecting the opposite wheels 15, 16 via the output shaft 13e can be omitted. The batteries 68 can be detachably mounted to the flange 14d of the interconnecting member 14 from the side of the interconnecting member 14. Electric wires 13g, shown schematically, include signal lines and electric power lines for supplying power from the batteries 68. The signal lines transmit signals from a right grip (speed control grip) 62 (FIG. 5) and from a starter switch 63 (FIG. 5) to a control circuit portion 13f.

Figure 22:
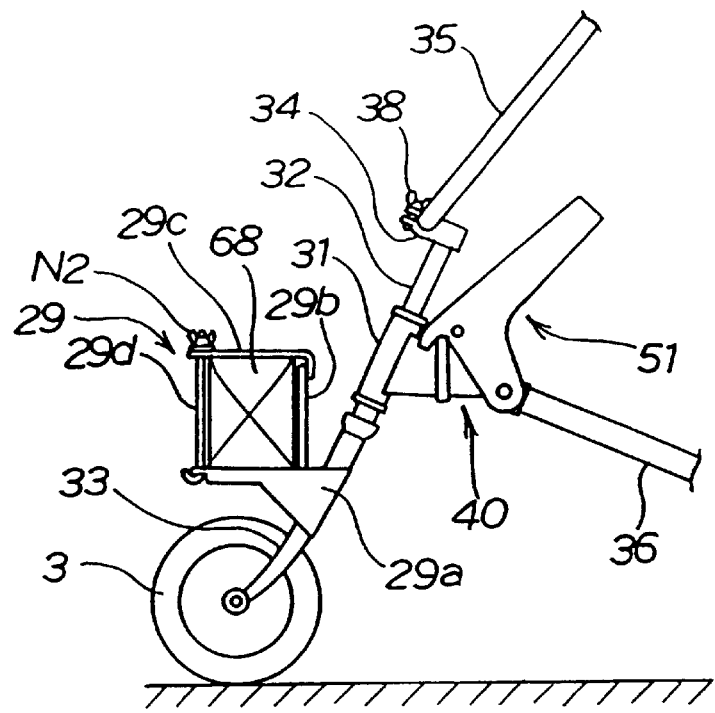
FIG. 22 is a side elevation of main portions of a yet other structure for mounting batteries according to the invention.

Referring to FIG. 22, there is shown a yet further example of structure for mounting batteries. The batteries 68 are housed in a battery-accommodating portion 29 mounted to the front forks 33.

The battery-accommodating portion 29 comprises a support base 29a, a rear plate 29b located behind the support base 29a and protruding upward, a clamper 29c having one end engaging with the rear plate 29b, and a metallic tying element 29d. The support base 29a is mounted to the front forks 33, and batteries 68 are placed on this support base 29a. The clamper 29c holds down the top surfaces of the batteries 68. The tying element 29d has a top screwed portion which permits the other end of the clamper 29c to be fixed with a butterfly nut N2. The tying element 29d further includes a hook engaging with the front end of the support base 29a. In this example, the batteries 68 are mounted in the space provided above the front wheel 3 by means of the rearwardly inclined front forks 33. Hence, the space can be effectively utilized. Furthermore, driving of the golf cart which is a motorized cart is not impeded. In addition, one can get on and off the cart without being hindered.

Figure 23:
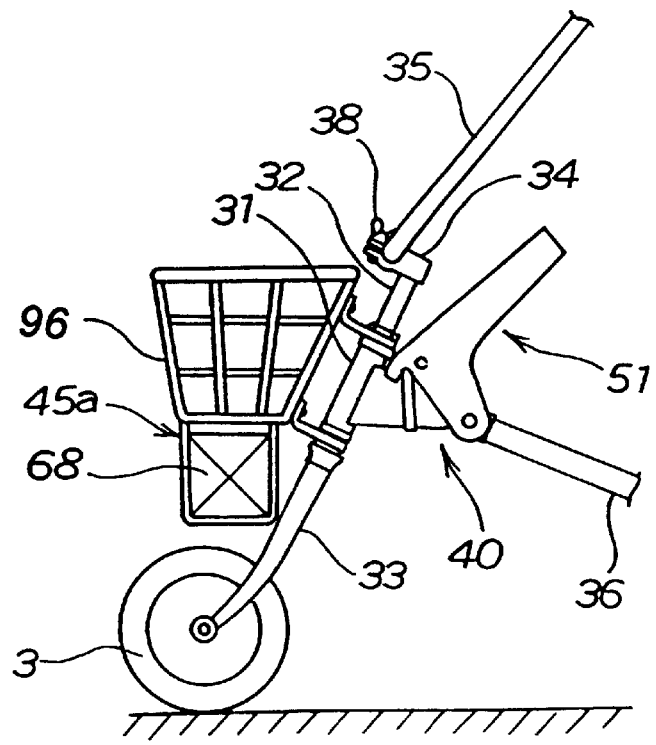
FIG. 23 is a side elevation of main portions of a still further structure for mounting batteries according to the invention.

Referring next to FIG. 23, there is shown a still additional example of structure for mounting batteries. The batteries 68 are suspended from the bottom of a small object-accommodating basket 96 by an anchoring means 45a of U-shaped cross section. The basket 96 is mounted to the top and bottom ends of a steering head 31 via metallic fixing elements. Consequently, the space under the bottom of the basket 96 can be used effectively. The small object-accommodating basket 96 may be equipped with an upper bottom portion and a lower bottom portion. The batteries 68 may be accommodated in the lower bottom portion. In this case, the batteries 68 are almost entirely concealed from view. Thus, the appearance is improved.

Figure 24:
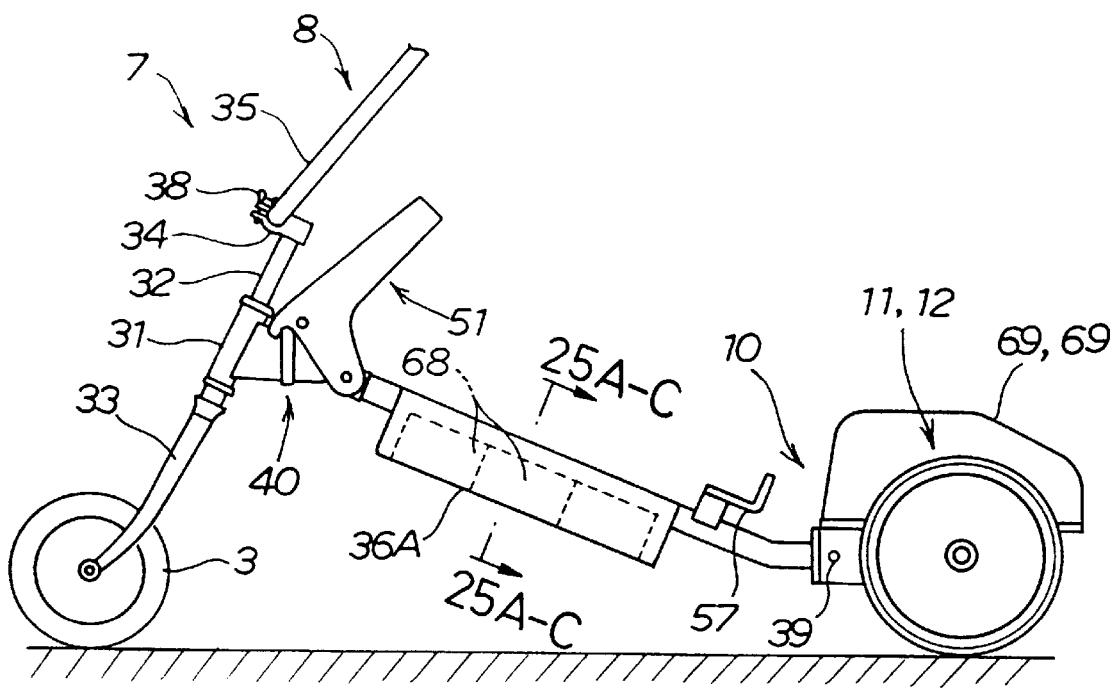
FIG. 24 is a side elevation of main portions of a yet further structure for mounting batteries according to the invention.

Referring next to FIG. 24, there is shown a yet additional example of structure for mounting batteries. The batteries 68 are accommodated in a hollow portion formed inside a center frame section 36A of a frame 8 of a cart. The center frame section 36A is long enough to prevent operation of the golf cart 7 that is a motorized cart from being impeded. Also, the center frame section is not an obstacle to the rider. Since the volume of the batteries can be made sufficiently large, the battery capacity can be rendered large. This is preferable for accommodation of the batteries. As a consequence, the batteries 68 are concealed from view. Hence, the cart is excellent from an aesthetical point of view. Furthermore, the space can be effectively utilized. Since the center frame section 36A is located near the center of gravity in the center of the cart, even if the batteries 68 are housed in the center frame section 36A, the center of gravity of the cart does not readily vary, hence, the stability is not impaired.

Figure 25A:
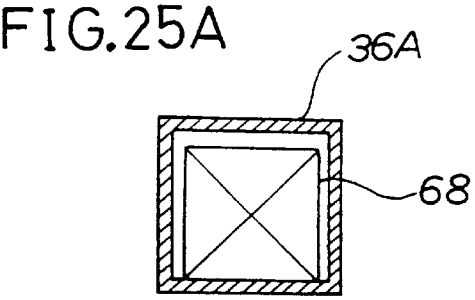
FIG. 25A is a cross-sectional view taken along line 25A–C—25A–C of FIG. 24.
Figure 25B:
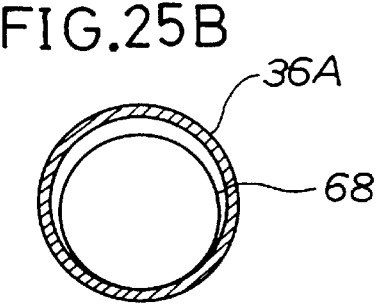
FIGS. 25B and 25C are cross-sectional view of modifications of the center frame shown in FIG. 25A.
Figure 25C:
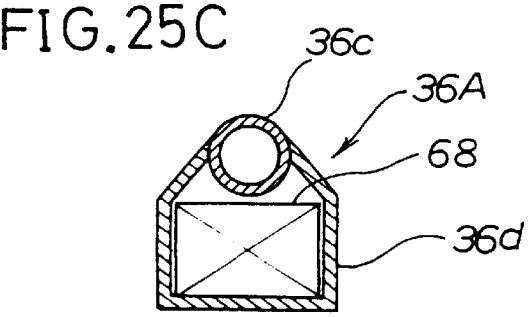

FIGS. 25A, 25B, and 25C are enlarged cross sections taken along line 25A–C—25A–C of FIG. 24. In FIG. 25A, the cross-sectional shape of the center frame section 36A assumes a rectangular form. In FIG. 25B, the cross-sectional shape of the center frame section 36A takes a circular form. In FIG. 25C, an additional accommodating portion 36d is welded or otherwise mounted to the base portion 36c of the frame in the form of a pipe. In FIG. 25C, if the accommodating portion 36d is detachably mounted to the base portion 36c, then it is easy to service the power unit.

In this way, the battery-mounting structures are not limited to the golf carts of the illustrated examples. These mounting structures can also be used in transportation vehicles, maintenance vehicles, and various kinds of carts, in the same way as in the foregoing examples.

FIG. 26 is a plan view of the golf cart 1 already described in connection with FIG. 4. This golf cart 1 is described in further detail below.

In the plan view of FIG. 26, the steering bar 35 takes a substantially U-shaped form and has two opposite grips 61 and 62 at its opposite ends, respectively. The starter switch 63 and a brake lever 24 are mounted close to the right grip 62.

The right grip 62 is a speed control grip for controlling the rotational speed of the driving motor to adjust the operating speed continuously. The right grip 62 is rotatably mounted to the steering bar 35. The starter switch 63 is a push switch for starting and stopping the motor 13. The brake lever 24 is used to brake the front wheel 3 via a brake wire (not shown). Furthermore, operation of the brake lever 24 produces regenerative braking action to the motor 13.

The interconnecting member 14 which is a rear frame consisting of a rectangular pipe assumes a T-shaped form in a plane. Two opposite rear wheels 15 and 16 are rotatably mounted to the opposite ends of the interconnecting member 14.

Figure 27:
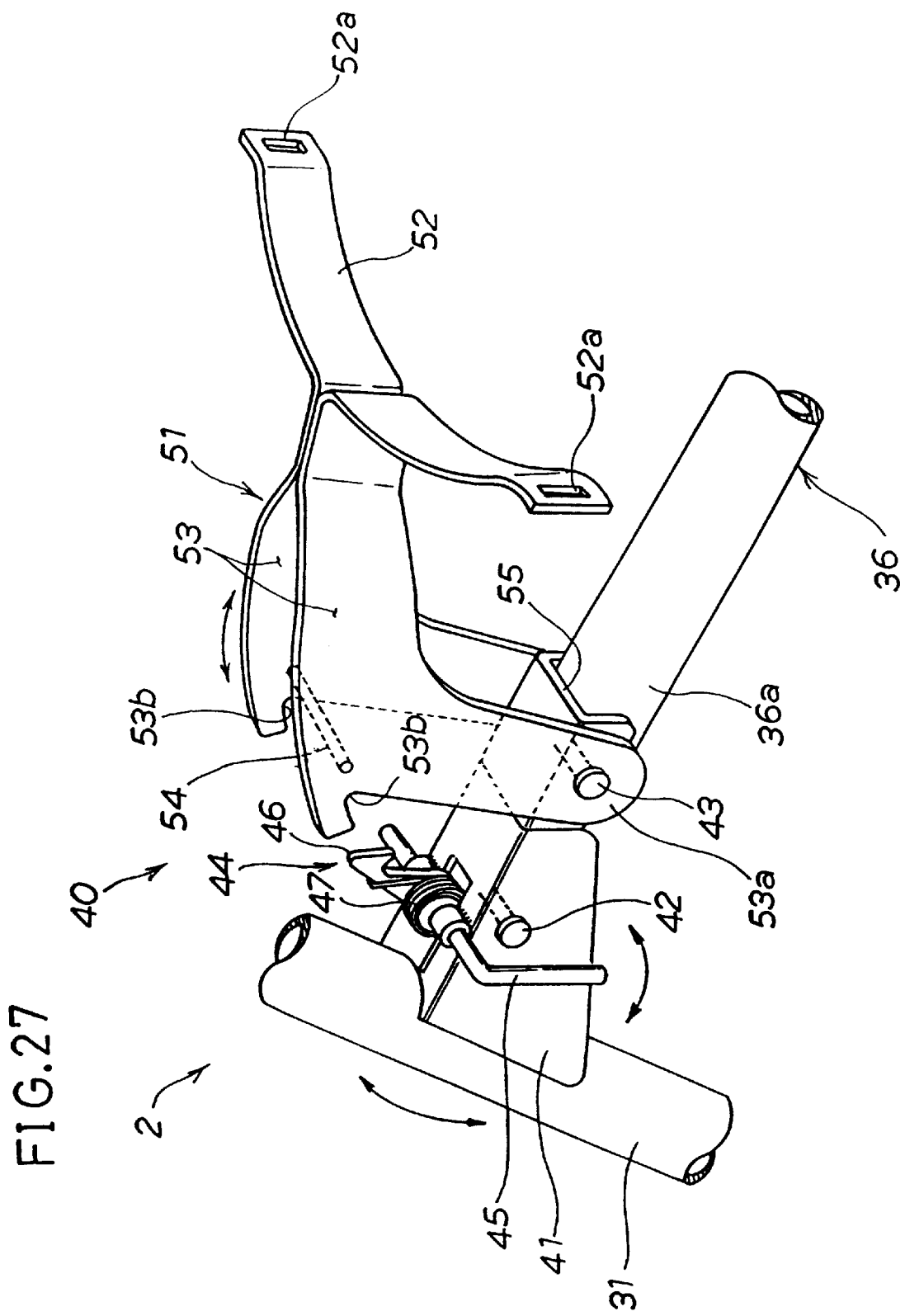
FIG. 27 is a detailed perspective view of a folding mechanism according to the invention.

FIG. 27 is a detailed perspective view of the mechanism 40 for folding the golf cart 1 in accordance with the present invention. The folding mechanism 40 comprises a bracket 41 of substantially U-shaped cross section, a first hinge pin 42, a second hinge pin 43, and an engaging portion 44 for anchoring the front end of the front support portion 51 to the top of the bracket 41. This bracket 41 is fixedly mounted to the back of the steering head 31. The bracket 41 and the front end portion 36a of the center frame 36 are interconnected by the first hinge pin 42 so as to be rotatable back and forth. The front support portion 51 is joined to the center frame 36 by the second hinge pin 43 so as to be swingable back and forth.

The engaging portion 44 comprises a lever 45 mounted over the bracket 41 so as to be swingable, an anchoring element 46 mounted to the lever 45, and a torsion spring 47 which brings the anchoring element 46 into resilient contact with the rear of the frame 2 of the cart in a clockwise direction.

The front support portion 51 has fork-like legs 53 which straddle both center frame 36 and bracket 41. The legs 53 comprise rear interconnecting portions 53a and an engaging pin 54 extending across the legs 53. The pin 54 is brought into engagement with the anchoring element 46. The rear interconnecting portions 53a are coupled to the center frame 36 by the aforementioned second hinge pin 43. Also shown is a spacer 55.

Figure 28:
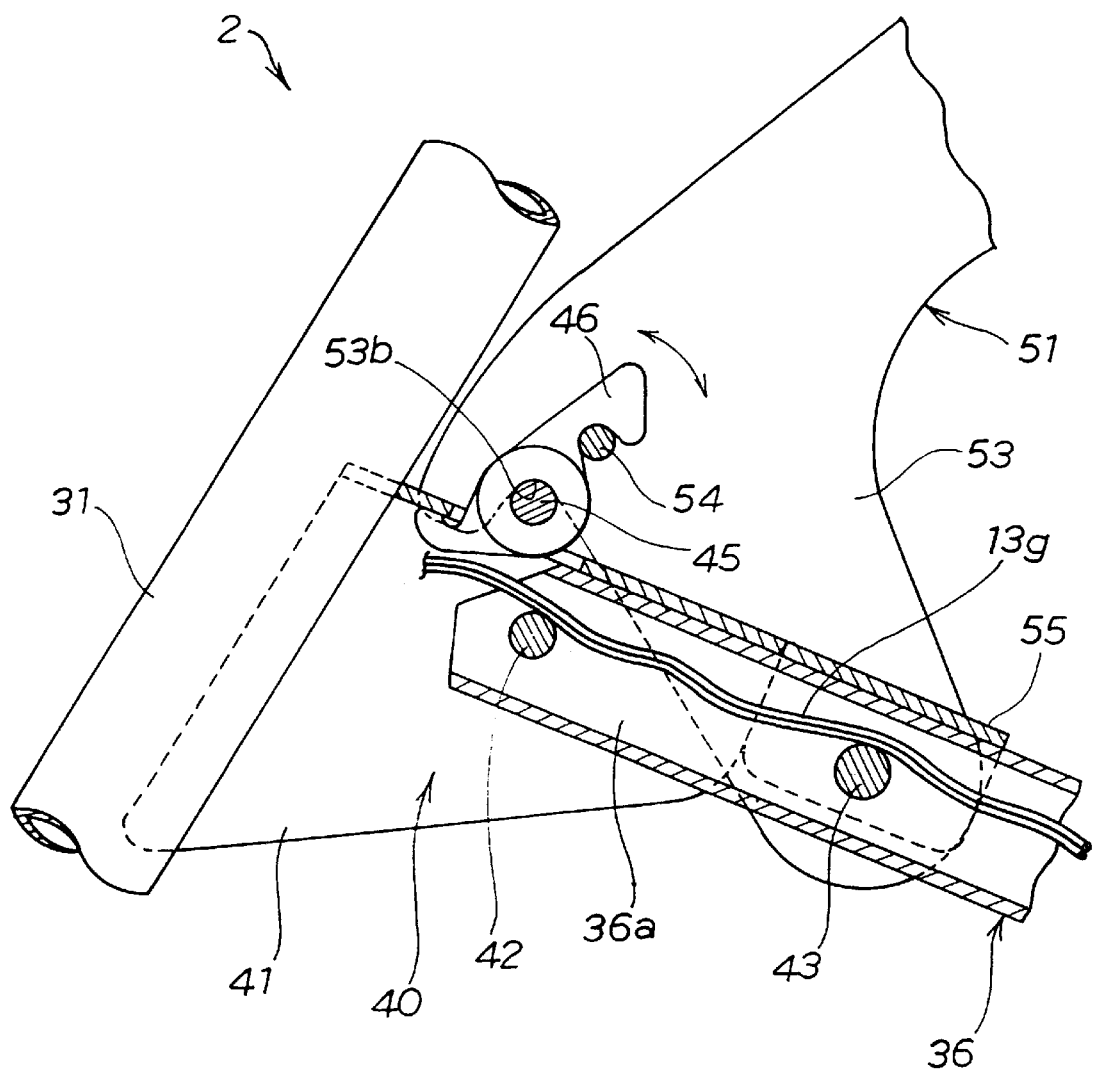
FIG. 28 is a cross-sectional view of main portions of the folding mechanism shown in FIG. 27.

FIG. 28 is a cross-sectional view of main portions of the novel folding mechanism 40. The center frame 36 is mounted to the steering head 31 via the folding mechanism 40.

The engaging pin 54 of the front support portion 51 engages the anchoring element 46. Under this condition, a grooved portion 53b is placed on the lever 45, so that the front support portion 51 is supported. Therefore, when the golf bag 58 is placed on the front support portion 51 as shown in FIG. 4, the weight of the bag 58 is sustained by the second hinge pin 43 and also by the lever 45. In FIG. 28, if the lever 45 is rotated in a counterclockwise direction, then the engaging pin 54 comes out of engagement with the anchoring element 46. This disconnects the folding mechanism 40 from the front support portion 51. Therefore, the front support portion 51 acts as a support on which the golf bag 58 is placed. Also, the front support portion 51 serves to connect the folding mechanism 40.

A method of operating the golf cart 1 which is a motorized cart is next described by referring to FIGS. 4 and 26.

First, the golf bag 58 is placed on the front support portion 51 and on the rear support portion 57 at a golf course. The bag 58 is attached to the front support portion 51 with a band or the like. In this case, the bag 58 is so placed that its top portion faces forward. It follows that the heads of plural golf clubs 39 held in the golf bag 58 face forward.

Then, an operator M such as a golf player indicated by the phantom lines rides on the platforms 66. He grips the two opposite grips 61 and 62 while standing. Then, he operates the starter switch 63 to start the driving motor 13.

If the right grip 62 is rotated, the left rear wheel 15 rotates. Thus, the golf cart 1 can be run at a desired speed. If the steering bar 35 is swung right and left, the direction of the front wheel 3 is changed. Therefore, the golf cart 1 can be steered. When the golf cart 1 should be brought to a stop, he grips the brake lever 24. This de-energizes the motor 13. Also, regenerative braking action is produced. At the same time, brake shoes (not shown) are actuated.

The procedure for folding the golf cart 1 constructed in this way is next described by referring to FIGS. 29A–29E.

Figure 29A:
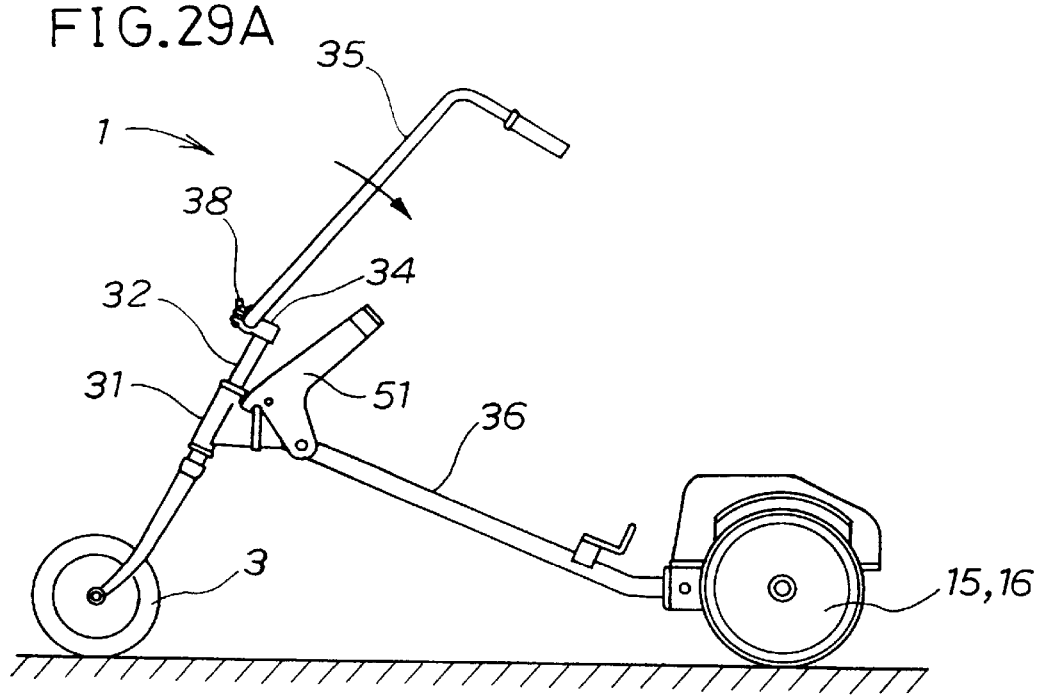
FIGS. 29A–29E are side elevations of the golf cart shown in FIG. 26, illustrating the procedure for folding the cart.
Figure 29B:
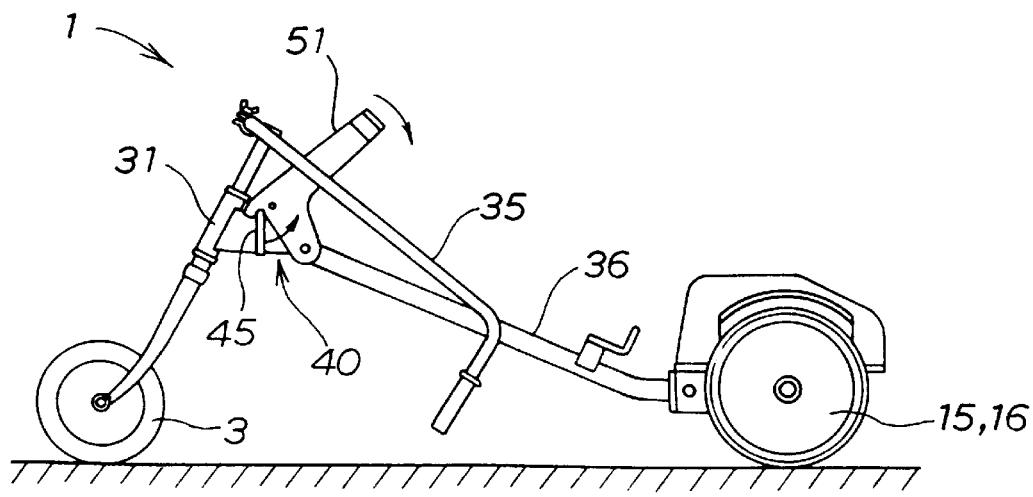
Figure 29C:
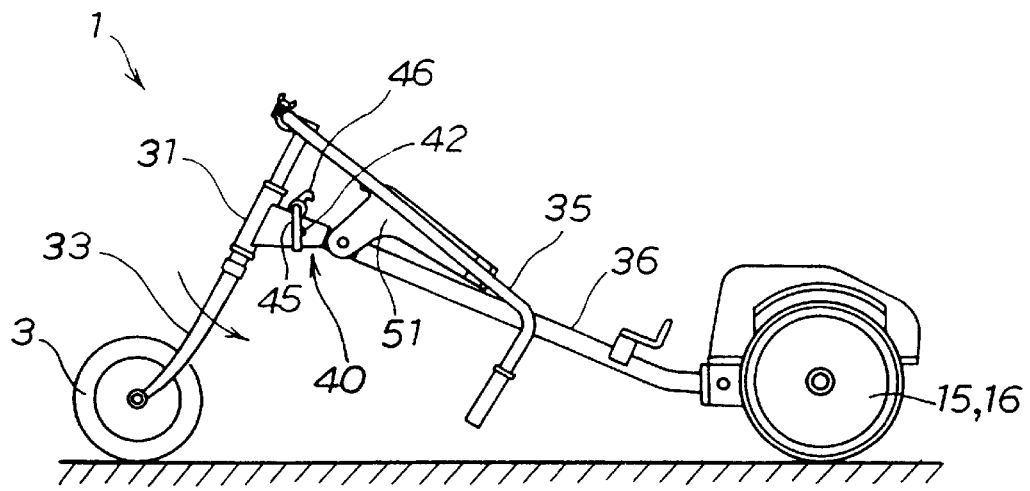

First, in the state shown in FIG. 29A, the bolt 38 equipped with the knob is loosened, and the steering bar 35 is thrown rearward as shown in FIG. 29B. In this way, the steering bar 35 is folded rearward, in the state shown in FIG. 29B, the lever 45 of the folding mechanism 40 is swung in a counterclockwise direction as indicated by the arrow. At the same time, as shown in FIG. 29C, the front support portion 51 is thrown rearwardly, i.e., in a clockwise direction. This unlocks the folding mechanism 40.

Figure 29D:
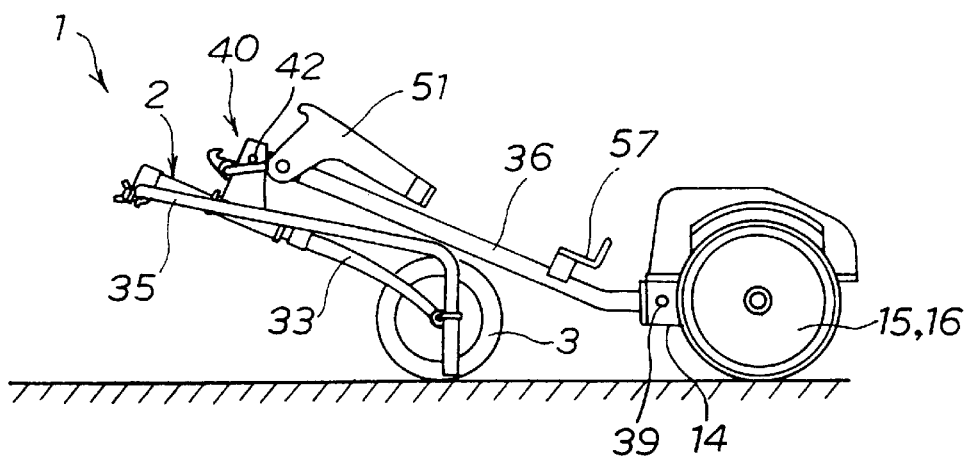

Finally, in the state shown in FIG. 29C, the front forks 33 are rotated about the first hinge pin 42 rearwardly, i.e., in a counterclockwise direction, as indicated by the arrow. As a result, the front forks 33 are folded rearwardly as shown in FIG. 29D. In this manner, the operation for folding the frame 2 of the cart is completed.

Figure 29E:
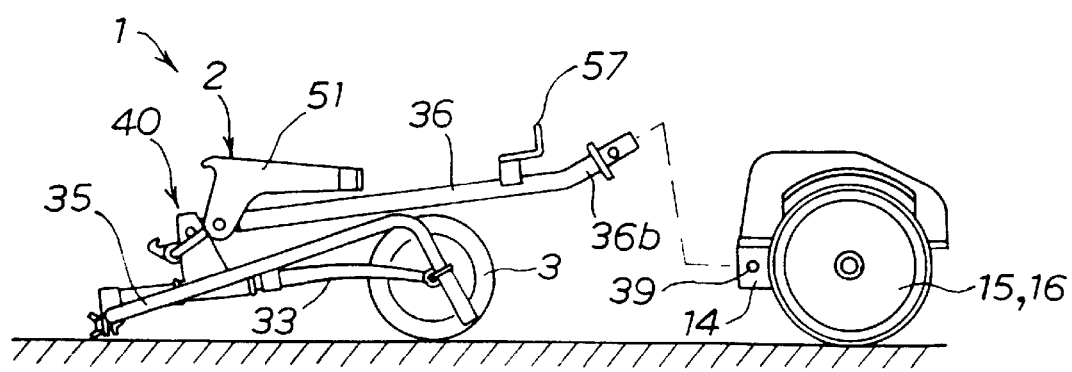

Then, if the golf cart 1 should be reduced further in size, the bolt 39 interconnecting the center frame 36 and the interconnecting member 14 is pulled out of the center frame 36, as shown in FIG. 29D. Consequently, the frame 2 of the cart is split into a front portion and a rear portion as shown in FIG. 29E. As a result, the size of the cart is further reduced.

FIGS. 30A–30E show modifications of motorized three-wheeled cart such as golf carts according to the present invention.

Figure 30A:
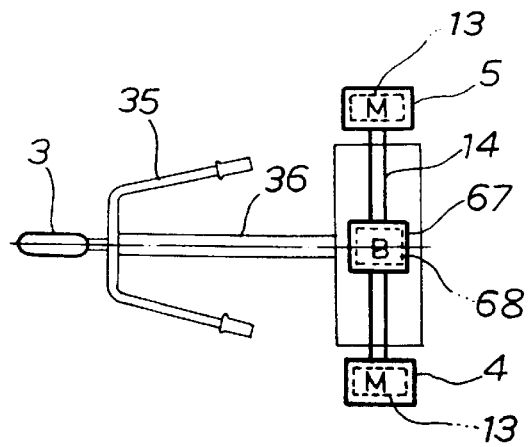
FIGS. 30A–30E are schematic plan views of modifications of a golf cart according to the invention.

FIG. 30A shows an example in which driving motors 13 are housed in two opposite rear wheels 4 and 5, respectively. Batteries 68 are housed in a battery-accommodating portion 67.

Figure 30B:
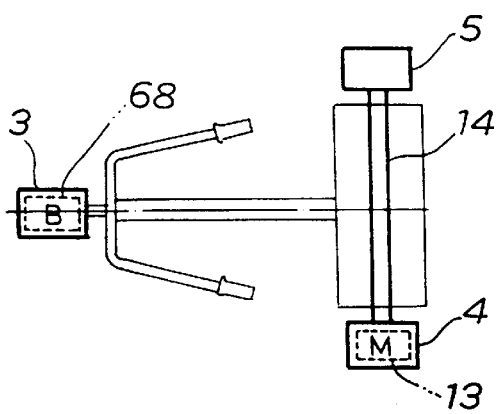

FIG. 30B shows an example in which batteries 68 are housed in one front wheel 3, and a driving motor 13 is housed in the left rear wheel 4.

Figure 30C:
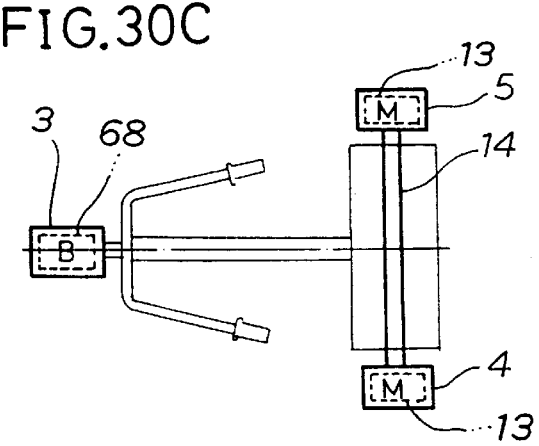

FIG. 30C shows an example in which batteries 68 are housed in the single front wheel 3, and diving motors 13 are housed in two opposite rear wheels 4 and 5, respectively.

Figure 30D:
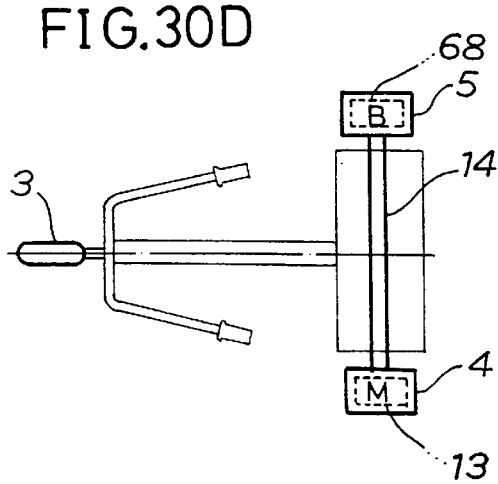

FIG. 30D shows an example in which a driving motor 13 is housed in the left rear wheel 4, and batteries 68 are housed in the right rear wheel 5.

Figure 30E:
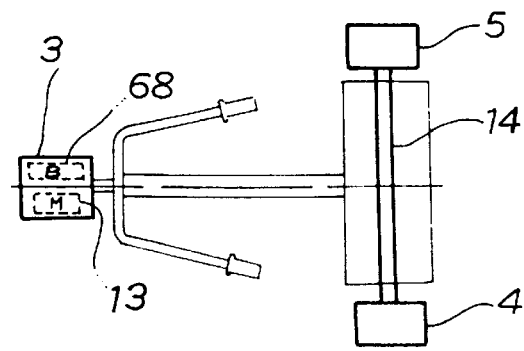

FIG. 30E shows an example in which a driving motor 13 and batteries 68 are housed in the front wheel 3.

The rear wheels 4 and 5 in which the driving motors 13 are housed are similar in structure with the wheels shown in FIG. 2.

The front wheel 3 shows in FIG. 30C and holding the batteries 68 and the rear wheel 5 shown in FIG. 30C and holding the batteries 68 are similar in structure with the wheels shown in FIGS. 8A and 8B.

Figure 31A:
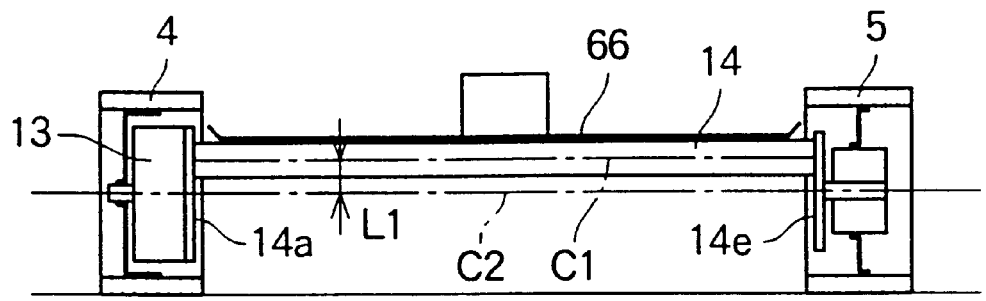
FIGS. 31A–31C are schematic plan views of other modifications of a golf cart according to the invention.
Figure 31B:
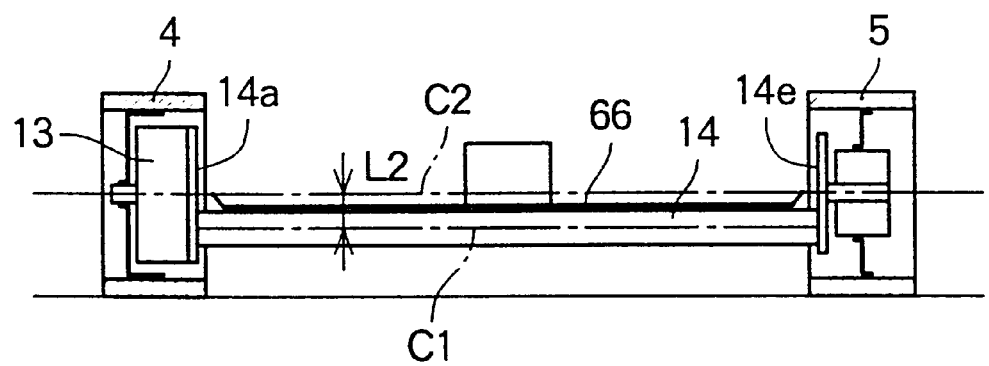
Figure 31C:
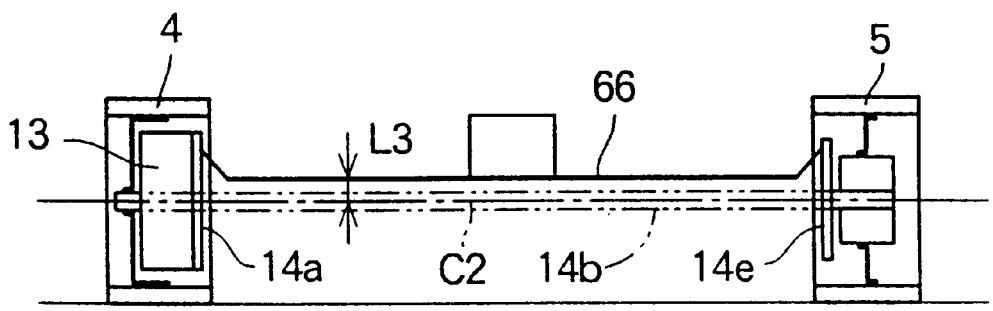
Figure 32:
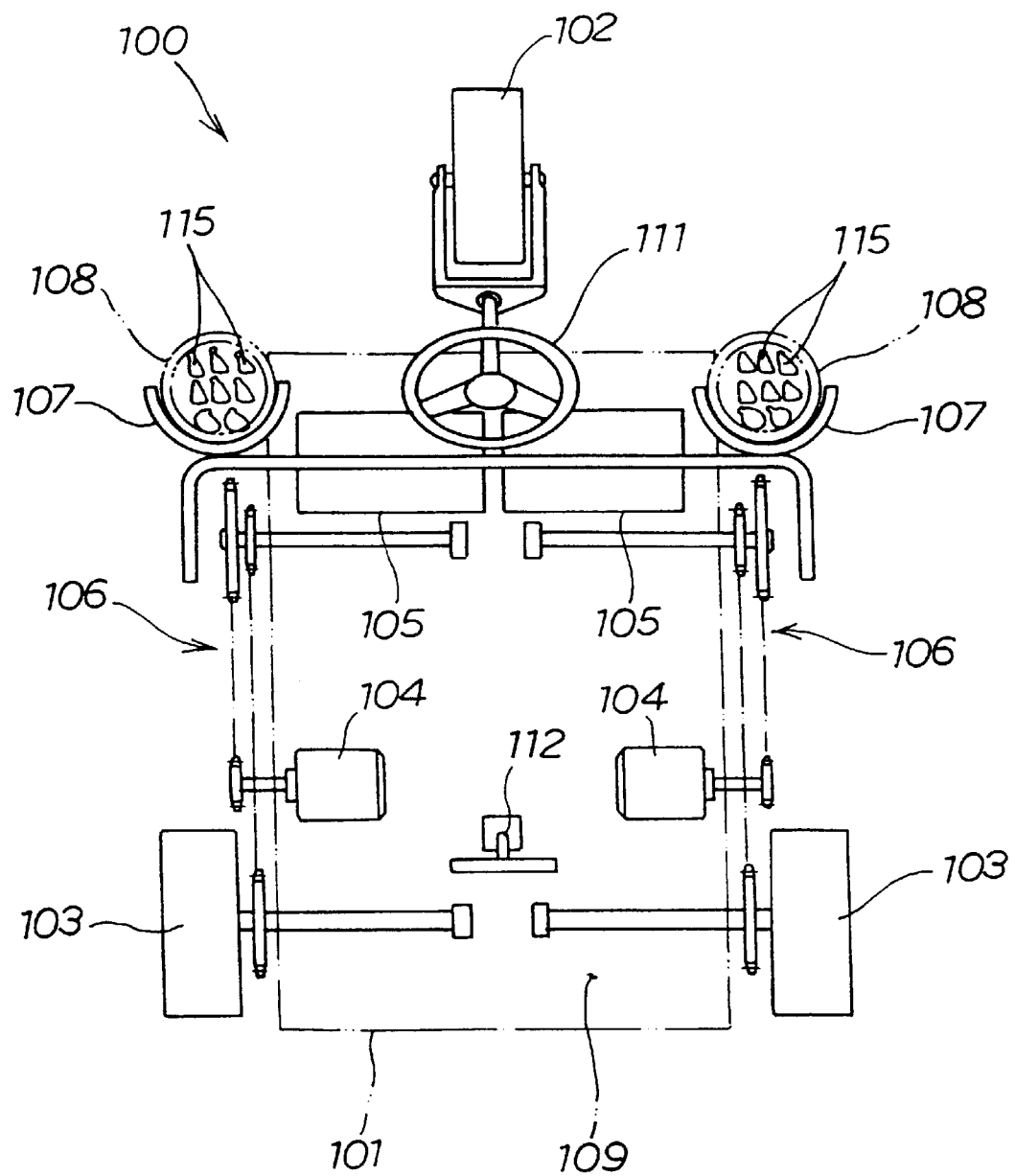
FIG. 32 is a plan view of the prior art electric golf cart.

FIGS. 31A–31C show other modifications of the golf cart which is a motorized three-wheeled cart. The relations among the height of two opposite rear wheels 4, 5, the height of an interconnecting member 14, and the height of a platform 66 are shown in these figures.

In FIG. 31A, the center C1 of the height of the interconnecting member 14 is shifted upward from the center C2 of the height of the two rear wheels 4 and 5 by a distance L1. In this modified example, the height of the interconnecting member 14 is elevated. As a result, the cart can go through rough ground surfaces with greater ease.

In FIG. 31B, the center C1 of the height of the interconnecting member 14 is shifted downward from the center C2 of the height of the rear wheels 4 and 5 by a distance L2 in this modified example, the height of the platform 66 is lowered. This facilitates going on and off the golf cart.

In FIG. 31C, the platform 66 acts also as an interconnecting member. The platform 66 is shifted upward from the center C2 of the two rear wheels 4 and 5 by a distance L3. In this modified example, any interconnecting member is not necessary except for an axle shaft 14b indicted by the phantom lines. This simplifies the structure of the frame of the cart. The platform 66 may be shifted downward from the center C2 of the height of the two rear wheels 4 and 5.

In these figures showing modified examples, a flange 14e mounts the interconnecting member to the right rear wheel 5. It can be appreciated that in FIGS. 31A and 31B, the interconnecting member 14 has an axle shaft (not shown but similar to 14b shown in FIG. 31C) extending through the interconnecting member 14 for transmitting power of the driving motor 13 accommodated in the left rear wheel 4 to an axis of the right rear wheel 5 via a suitable power transmitting device, such as a chain drive, a gear train, or the like (neither shown). Additionally, in the case of a golf cart having a driving motor 13 accommodated within the front wheel 3, such as is shown in FIG. 30E, the left and right rear wheels 4, 5 are rotatably interconnected by the interconnecting member 14 having an axis rotatably extending therethrough and connected at opposite ends to the rear wheels 4, 5. The interconnecting member 14 can be shifted upward or downward from a center of height of the rear wheels 4, 5 in the same manner as shown in FIGS. 31A and 31B.

In the above golf cart examples, including modified ones, where the driving motor is housed in one of two wheels, the motor can be housed either in the left wheel or in the right wheel. Where the driving motor is housed in one of two opposite wheels and batteries are housed in the other wheel, the driving motor or batteries may be housed in either one of the opposite wheels.

We claim:

1. A motorized cart, comprising:
   a vehicle including a frame forming a body, a pair of wheels spaced from each other horizontally, and an interconnecting member having opposite ends to which said wheels are rotatably mounted, said interconnecting member forming part of said frame;
   electric motors being housed in both of said wheels, wherein said electric motors drive said wheels independently and synchronously; and
   batteries for driving said electric motors.

2. A motorized cart according to claim 1, wherein said vehicle also includes at least one front fork having a front wheel and mounted to said frame so as to be swingable relative to said frame, and
   said batteries being detachably mounted to said front fork.

3. A motorized cart according to claim 1, wherein said vehicle also includes at least one front fork having a front wheel and mounted to said frame so as to be swingable relative to said frame,
   said cart further includes a basket for accommodating small objects, said basket being attached to said front fork, said basket having a bottom, and
   said batteries being detachably mounted to the bottom of said basket.

4. A motorized cart according to claim 1, wherein said frame is partially or totally hollow, and said batteries are housed in said hollow frame.

5. A motorized cart according to claim 4, wherein said hollow frame has a circular cross-sectional shape.

6. A motorized cart according to claim 4, wherein said hollow frame has a rectangular cross-sectional shape.

7. A motorized cart according to claim 4, wherein said hollow frame includes a base portion formed of a pipe and a battery accommodating portion mounted to said base portion, said batteries being accommodated within said battery accommodating portion.

8. A motorized cart according to claim 1, wherein said vehicle also includes a battery-accommodating portion of inverted U-shaped cross-section disposed over said interconnecting member, and
   said batteries being accommodated within said battery-accommodating portion.

9. A motorized cart according to claim 8, wherein said vehicle further including a pair of platforms spaced apart from each other horizontally and mounted over said interconnecting member, wherein said battery-accommodating portion is disposed between said platforms.

10. A motorized cart according to claim 8, wherein said battery-accommodating portion has an opening at an upper side thereof for allowing insertion of said battery into said battery-accommodating portion.

11. A motorized cart according to claim 10, wherein said vehicle further including a pair of platforms spaced apart from each other horizontally and mounted over said interconnecting member, wherein said battery-accommodating portion is disposed between said platforms.

12. A motorized cart according to claim 1, wherein said vehicle has a single front wheel rotatably mounted to said frame, said pair of wheels being rear wheels whereby said motorized cart is a motorized three-wheeled cart, and wherein said batteries are accommodated within said front wheel.

13. A motorized cart according to claim 1, wherein said interconnecting member has a substantially Y-shaped form when viewed in plan.

14. A motorized cart according to claim 1, wherein said interconnecting member has a rectangular form having an open rear side when viewed in plan.

15. A motorized cart according to claim 1, wherein said interconnecting member has an inverted U-shaped form as viewed from its front side, and wherein one or more seats are mounted over a center of said interconnecting member.

16. A motorized cart according to claim 1, wherein said interconnecting member has an inverted T-shaped form as viewed from its front side, and wherein one or more seats are mounted over a center of said interconnecting member.

17. A motorized cart according to claim 1, wherein said interconnecting member is split into plural parts hinged together, whereby said interconnecting member can be folded.

18. A motorized cart according to claim 1, wherein said frame is capable of being split into a front part and a rear part, and wherein said front part of said vehicle includes at least one front fork having a front wheel, and said rear part of said frame includes said interconnecting member.

19. A motorized cart according to claim 18, wherein said front part of said frame is capable of being folded.

20. A motorized cart according to claim 18, wherein said frame is capable of being folded.

21. A motorized cart according to claim 1, wherein said vehicle further includes a single front wheel mounted to said frame, and wherein said frame includes a center frame extending from said front wheel rearwardly and downwardly, said center frame having a front support portion at its front portion and a rear support portion at its rear portion.

22. A motorized cart according to claim 1, wherein said interconnecting member is shifted upward or downward from a center of height of said wheels.

* * * * *